(12) United States Patent
Hayashi et al.

(10) Patent No.: US 11,663,351 B2
(45) Date of Patent: May 30, 2023

(54) INFORMATION PROCESSING SYSTEM, INFORMATION PROCESSING DEVICE, AND NON-TRANSITORY COMPUTER-READABLE STORAGE MEDIUM FOR STORING PROGRAM OF CONTROLLING ACCESS AUTHORITY

(71) Applicant: FUJITSU LIMITED, Kawasaki (JP)

(72) Inventors: Erika Hayashi, Yokohama (JP); Hiroki Ohtsuji, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 266 days.

(21) Appl. No.: 17/110,364

(22) Filed: Dec. 3, 2020

(65) Prior Publication Data
US 2021/0232698 A1 Jul. 29, 2021

(30) Foreign Application Priority Data
Jan. 23, 2020 (JP) .............................. JP2020-008829

(51) Int. Cl.
*G06F 21/62* (2013.01)
*G06F 16/185* (2019.01)
(52) U.S. Cl.
CPC ........ *G06F 21/6218* (2013.01); *G06F 16/185* (2019.01)
(58) Field of Classification Search
CPC ..... G06F 21/6218; G06F 16/185; G06F 21/62
See application file for complete search history.

(56) References Cited

U.S. PATENT DOCUMENTS

| | | | |
|---|---|---|---|
| 8,015,204 B2* | 9/2011 | Kaler | H04L 63/123 707/999.009 |
| 2010/0138922 A1* | 6/2010 | Zaifman | G06F 21/6218 707/E17.014 |
| 2012/0036583 A1* | 2/2012 | Kichikawa | G06F 21/6218 726/27 |
| 2016/0259783 A1 | 9/2016 | Takata et al. | |
| 2019/0251281 A1* | 8/2019 | Freedman | G06F 21/10 |

FOREIGN PATENT DOCUMENTS

| | | |
|---|---|---|
| JP | 2013-167942 A | 8/2013 |
| WO | 2015/145632 A1 | 10/2015 |

* cited by examiner

*Primary Examiner* — Quazi Farooqui
(74) *Attorney, Agent, or Firm* — Fujitsu Patent Center

(57) ABSTRACT

A system includes a plurality of information processing devices configured to manage, in a distributed manner, meta information indicating access authority for directories having a hierarchical structure for accessing a file, wherein at least one of the plurality of information processing devices is configured to: receive an access request to the file; respond with a confirmation result of the access authority according to confirmation of the access authority of an access request source from a higher directory of the file to the file based on the meta information; and in response to determining that creating of an access right confirmation history of the confirmation result of the access authority of the access request source from the higher directory to the file based on an access history for the file is to be performed, create the access right confirmation history in association with identification information of the access request source.

8 Claims, 24 Drawing Sheets

FIG. 4
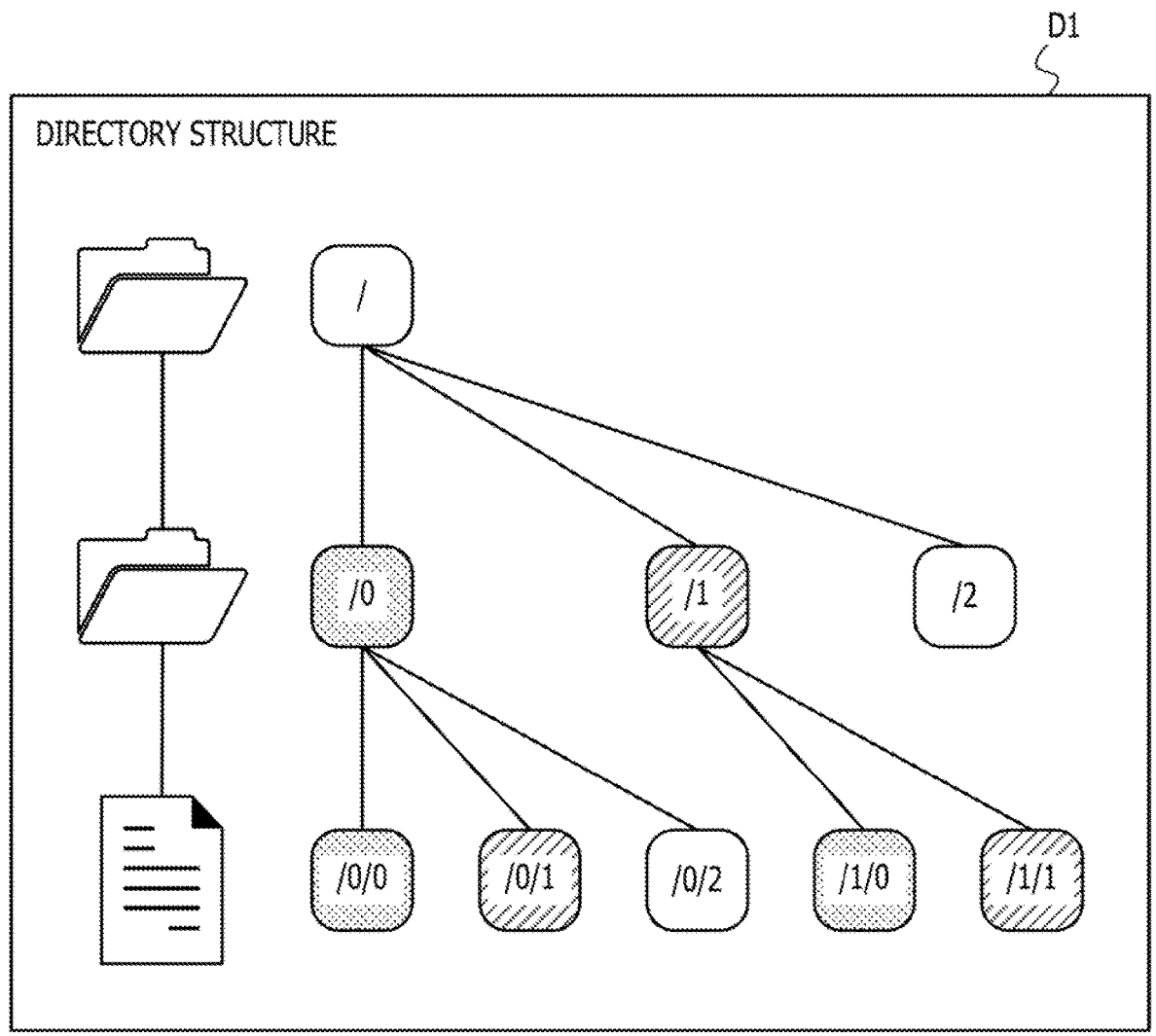
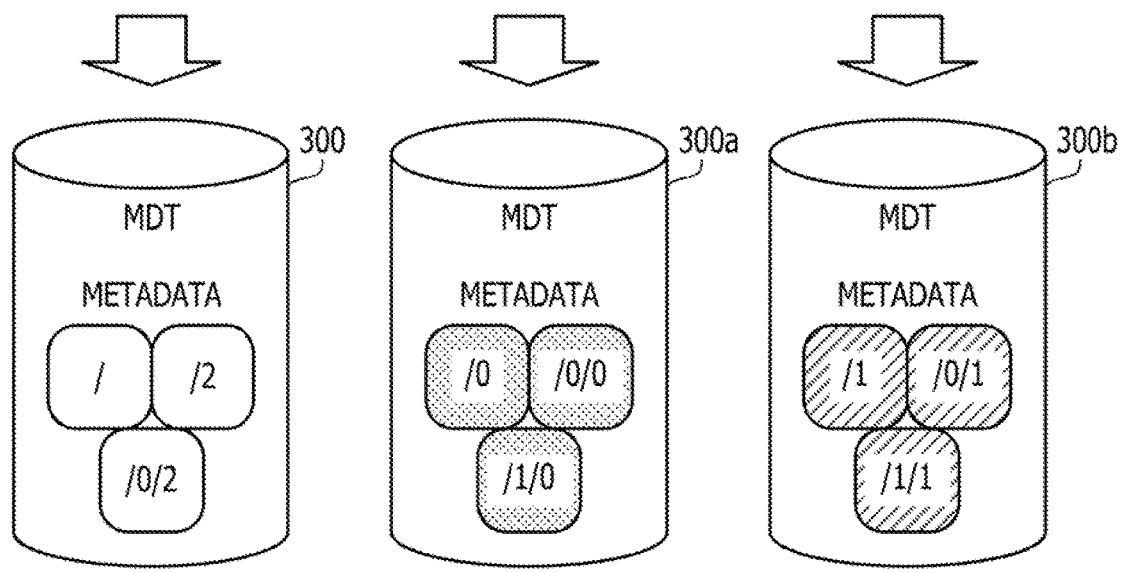

FIG. 8

| FILE NAME/ DIRECTORY NAME | USER uid | USER gid | EP |
|---|---|---|---|
| /dir1 | uid1 | gid1 | 1 |
| /dir1 | uid2 | gid1 | 0 |
| /dir2/file1 | uid3 | gid2 | 1 |
| ... | ... | ... | ... |

311

ACCESS RIGHT CONFIRMATION HISTORY

INFORMATION PROCESSING SYSTEM, INFORMATION PROCESSING DEVICE, AND NON-TRANSITORY COMPUTER-READABLE STORAGE MEDIUM FOR STORING PROGRAM OF CONTROLLING ACCESS AUTHORITY

CROSS-REFERENCE TO RELATED APPLICATION

This application is based upon and claims the benefit of priority of the prior Japanese Patent Application No. 2020-8829, filed on Jan. 23, 2020, the entire contents of which are incorporated herein by reference.

FIELD

The present embodiments discussed herein are related to an information processing system, an information processing device, and a non-transitory computer-readable storage medium storing a program.

BACKGROUND

In the field of information processing, to efficiently handle a large number of files, data management by a distributed file system is sometimes performed. In the distributed file system, substance of the file and meta information of the file are separated and managed by different information processing devices in a distributed manner.

For example, there is a proposal of a distributed file access device that avoids concentration of load on a specific server that stores metadata files that store metadata of data files by arranging the metadata files in a distributed manner. In this proposal, the metadata file includes information of a data file name, an access right, an owner, and a storage destination of the data file.

Furthermore, there is also a proposal of a computer system that provides metadata of an object of a content addressed storage (CAS) device corresponding to a file or a directory inheriting metadata of a higher directory with a universally unique identifier (UUID) corresponding to the inheritance source directory as inheritance information. In the proposed computer system, a metadata conversion device interprets the inheritance information stored in the CAS device.

Examples of the related art include Japanese Laid-open Patent Publication No. 2013-167942, and International Publication Pamphlet No. WO 2015/145632.

SUMMARY

According to an aspect of the embodiments, provided is an information processing system configured to perform access management using meta information including information indicating access authority for directories having a hierarchical structure for accessing a file. In an example, the information processing system includes a plurality of information processing devices configured to manage the meta information of each directory from a higher directory of the file to the file in a distributed manner, wherein at least one information processing device among the plurality of information processing devices is configured to: receive an access request to the file; respond with a confirmation result of the access authority according to confirmation of the access authority of an access request source from the higher directory of the file to the file based on the meta information; obtain a determination result by determining whether to create an access right confirmation history of the confirmation result of the access authority of the access request source from the higher directory to the file on a basis of an access history for the file; and in response to the determination result indicating that the creating of the access right confirmation history is to be performed, create the access right confirmation history in association with identification information of the access request source.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of distributed arrangement of metadata;

FIG. 8 is a diagram illustrating a storage example of EP in metadata;

DESCRIPTION OF EMBODIMENTS

Files are hierarchically managed by directories. In the case where access authority is set to a file, an access to the file may not be permitted unless an access request source is permitted to access all of higher directories of the file and the file. In this case, when the access request source tries to access a certain file, an information processing device confirms the access authority of each higher directory on the basis of meta information of all the higher directories of the file. However, if the access authority of each higher directory is individually confirmed on the basis of each meta information every time the file is accessed, it takes time to confirm the access authority.

Particularly, in the distributed file system, there are some cases where the meta information of a certain file and the meta information of the higher directories of the file are managed by different devices. In this case, to confirm the access authority of directories of respective layers, communication is needed between devices that manage the meta information of the directories of the respective layers or between a device of the access request source and the device that manages the meta information of directories of respective layers, and confirmation of the access authority is further delayed.

According to one aspect, an object of the present embodiments is to provide an information processing system, an information processing device, and a program capable of efficiently managing access authority.

Hereinafter, the present embodiment will be described with reference to the drawings.

First Embodiment

A first embodiment will be described.

Figure 1:
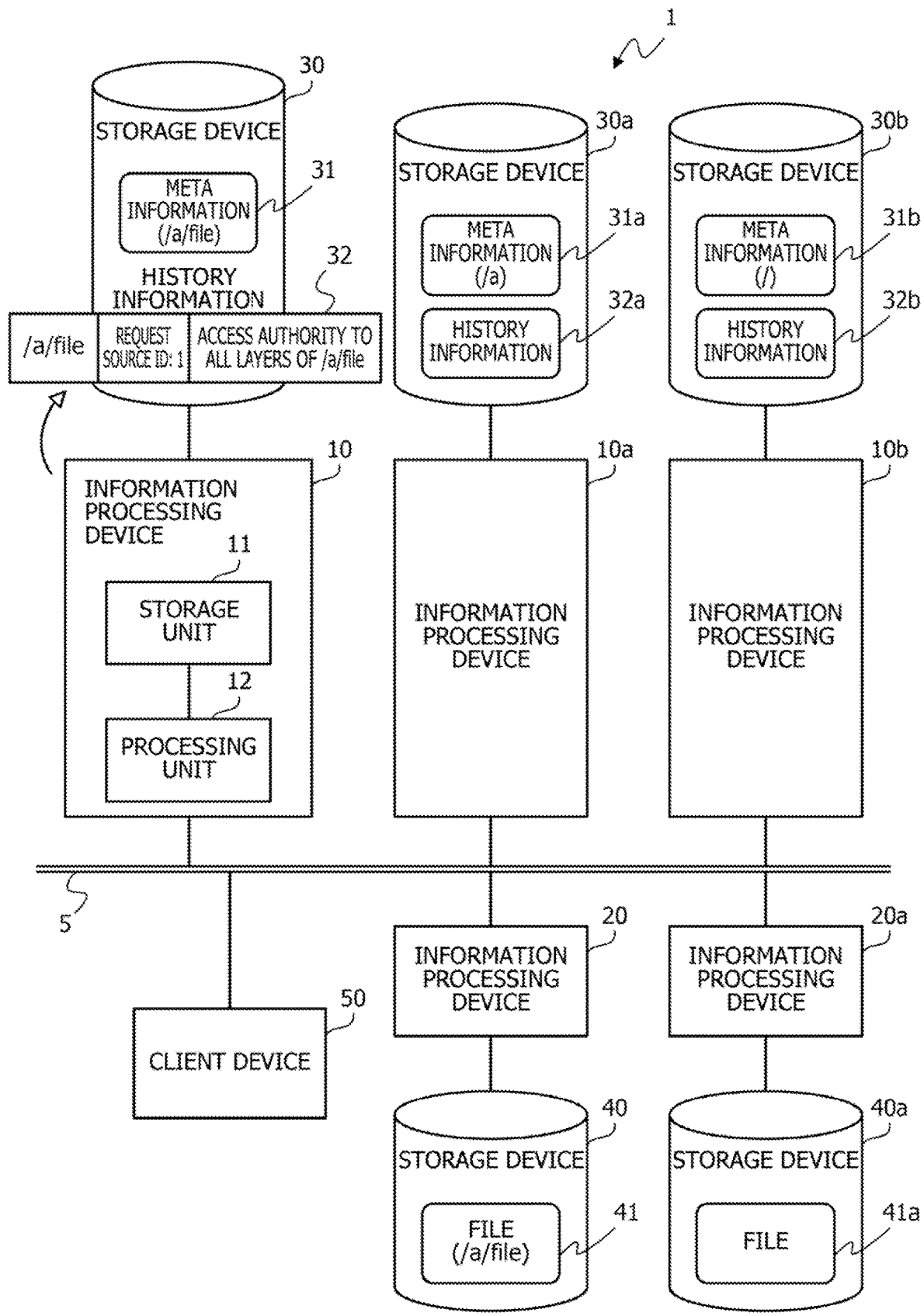
FIG. 1 is a diagram illustrating a processing example of an information processing system according to a first embodiment.

FIG. 1 is a diagram illustrating a processing example of an information processing system according to a first embodiment.

An information processing system 1 performs access management using meta information including information indicating access authority for directories having a hierarchical structure for accessing a file.

The information processing system 1 includes information processing devices 10, 10a, 10b, 20, and 20a, storage devices 30, 30a, 30b, 40, and 40a, and a client device 50. The information processing devices 10, 10a, 10b, 20, and 20a and the client device 50 are connected to a network 5. The information processing devices 10, 10a, and 10b are respectively connected to the storage devices 30, 30a, and 30b. The information processing devices 20 and 20a are respectively connected to the storage devices 40 and 40a. Note that the number of information processing devices and the number of storage devices illustrated in FIG. 1 are examples and may be other numbers.

The information processing system 1 stores a file and meta information of the file in different storage devices in a distributed manner. Here, the "file" refers to a data body managed as a file. The file may be called file body, file substance, object, or the like. Furthermore, the file may include a data file having a predetermined data format processed by an application and a special file representing a directory. The meta information includes an owner of the file, access authority of each access request source, creation date and time of the file, a file storage address, and the like, regarding identification information of the file.

When accessing a certain file, the client device 50 acquires the file storage address of the file from the information processing device that manages the meta information of the file. Then, the client device 50 requests the file from the information processing device indicated by the file storage address.

In the example of the information processing system 1, a plurality of pieces of meta information is stored in the storage devices 30, 30a, and 30b in a distributed manner. Furthermore, a plurality of files is stored in the storage devices 40 and 40a in a distributed manner. For example, the storage devices 30, 30a, and 30b respectively store meta Information 31, 31a, and 31b. The storage devices 40 and 40a respectively store files 41 and 41a. The meta information 31 is meta information of the file 41 represented by a file name "/a/file". The meta information 31a is meta information of a directory represented by a directory name "/a". The meta information 31b is meta information of a directory represented by a directory name "/". Note that the data bodies for the meta information 31a and 31b are stored in the storage devices 40 and 40a but illustration is omitted in FIG. 1. Note that, for example, the file 41a may be considered to be the data body for the meta information 31a.

For example, when the client device 50 tries to access the file 41, the access request source is needed to have access authority to all the higher directories "/" and "/a" of the file 41 and the file 41. When it is confirmed that the access request source has the access authority to all the higher directories and the file 41, the information processing device 10 provides the client device 50 with the storage address of the file 41 on the basis of the meta information 31. Here, the access request source is a user who operates the client device 50 or a group to which the user belongs, for example, and is specified by identification information of the user or identification information of the group.

The meta information 31b of the directory "/" is managed by the information processing device 10b. Therefore, the access authority of the access request source to the directory "/" is confirmed by the information processing device 10b. The meta information 31a of the directory "/a" is managed by the information processing device 10a. Therefore, the access authority of the access request source to the directory "/a" is confirmed by the information processing device 10a. The meta information of the file 41 (file name "/a/file") is managed by the Information processing device 10. Therefore, the access authority of the access request source to the file 41 is confirmed by the information processing device 10.

The inquiry as to whether the access request source has the access authority to the access destination may be made in order for the information processing devices 10b, 10a, and 10 by the client device 50 when the access destination is "/a/file" for example. The client device 50 specifies the information processing device that manages the meta information for the file name or the like, on the basis of, for example, a hash value of a full path file name, a full path directory name, or the like. The client device 50 makes an inquiry in order from a higher layer, and in the case where it is determined that the access request source does not have the access authority in a certain layer, the client device 50 does not make an inquiry about the access authority of a layer lower than the certain layer. The inquiry about the access authority may be performed for the information processing devices 10a and 10b by the information processing device 10 that has received an access request from the client device 50, for example, in the case where the access destination is "/a/file".

However, it takes a long time to confirm the access authority of the access request source from the higher directories to the file on the basis of each meta information every time the file 41 is accessed. Therefore, the information processing devices 10, 10a, and 10b provide a function to efficiently manage the access authority. Note that, hereinafter, description will be given using the information processing device 10 as an example. However, the information processing devices 10a and 10b also have a similar function.

The information processing device 10 includes a storage unit 11 and a processing unit 12.

The storage unit 11 may be a volatile storage device such as a random access memory (RAH) or may be a non-volatile storage device such as a hard disk drive (HDD) or a flash memory. The processing unit 12 may include a central processing unit (CPU), a digital signal processor (DSP), an application specific integrated circuit (ASIC), a field programmable gate array (FPGA), and the like. The processing unit 12 may be a processor that executes a program. The "processor" here may include a set of a plurality of processors (multiprocessor).

The storage unit 11 stores an access history for a file (for example, the file 41) corresponding to the meta information stored in the storage device 30. For example, the access history is an access count for the file. The access count may be stored in the storage device 30.

The processing unit 12 counts the access count for a file (for example, the file 41) corresponding to the meta information stored in the storage device 30, and stores the access count in the storage unit 11 or the storage device 30. For example, the processing unit 12 increments the access count of the file 41 when having received the access request for the file 41. Alternatively, the processing unit 12 may increment the access count of the file 41 after it is confirmed that the access request source has the access authority to the file 41 in response to the access request.

The processing unit 12 receives the access request to the file 41 from the client device 50. The processing unit 12 responds to the client device 50 with a confirmation result of the access authority according to the confirmation of the access authority of the access request source from the higher directories of the file 41 to the meta information of the file 41 based on the meta information 31, 31a, and 31b.

For example, in the case where the information processing devices 10b, 10a, and 10 have confirmed that the access request source has the access authority to "/", "/a", and "/a/file", respectively, it is confirmed that the access request source has the access authority to all the Sayers included in "/a/file". In this case, the processing unit 12 responds to the client device 50 with the storage address of the file 41 as a confirmation result indicating that the access request source has the access authority. Meanwhile, in the case where it is confirmed that the access request source does not have the access authority in any of the layers included in "/a/file", the processing unit 12 responds to the client device 50 that the access request source does not have the access authority.

Note that, as described above, when trying to access the file 41, the client device 50 inquires of the information processing devices 10b, 10a, and 10 in order about the access authority. The information processing devices 10b, 10a, and 10 may each confirm the access authority of the access request source to directories or files of respective layers on the basis of the meta information managed by the information processing devices 10b, 10a, and 10, and respond to the client device 50. In this case, when the client device 50 finds that the access request source does not have the access authority in a certain layer, the client device 50 does not make an inquiry about the access authority of a layer lower than the certain layer. Therefore, in the case where there is an inquiry to the information processing device 10, that is, in the case where there is the access request to the file 41, the processing unit 12 may determine that it is confirmed that the access request source has the access authority to all the higher directories of the file 41. Alternatively, when making an inquiry about the access authority of a certain directory, the client device 50 may notify the inquiry source information processing device that the access request source has the access authority to all the directories higher than the certain directory.

Meanwhile, it is also conceivable that the processing unit 12 makes an inquiry about the access authority of the access request source for the higher directories of the file 41 in response to the access request from the client device 50. In this case, the processing unit 12 inquires of the information processing devices 10b and 10a about the access authority of the access request source for "/" and "/a", respectively. Then, the processing unit 12 acquires the confirmation results of the access authority from the information processing devices 10b and 10a, and determines the presence or absence of the access authority of the access request source to the higher directories of the file 41.

The processing unit 12 determines whether to create an access right confirmation history indicating the confirmation result of the access authority of the access request source from the higher directories to the file 41 on the basis of the access history for the file 41 stored in the storage unit 11. For example, the processing unit 12 makes the determination according to whether the access count for the file 41 is equal to or larger than a threshold. The processing unit 12 determines to create the access right confirmation history in the case where the access count is larger than the threshold, and determines not to create the access right confirmation history in the case where the access count is equal to or smaller than the threshold. Note that the access count may be an access count in a specific length period, that is, an access frequency.

When the processing unit 12 determines to create the access right confirmation history, the processing unit 12 creates the access right confirmation history in association with the identification information of the access request source. The processing unit 12 stores the created access right confirmation history in the storage device 30 or the storage unit 11 that stores the meta information 31. History information 32 indicates an example of the created access right confirmation history. The history information 32 is stored in the storage device 30, for example. The history information 32 may be added to the meta information 31 of the file 41. When the processing unit 12 determines not to create the access right confirmation history, the processing unit 12 does not create the access right confirmation history.

The history information 32 includes information of the access request destination file name "/a/file", access request source identification information "request source ID: 1" (ID is an abbreviation for identifier) and the confirmation result of the access authority indicating that "the access request source has the access authority to all the layers of /a/file", The history information 32 indicates that it has been confirmed in the past that the access request source has the access authority to all the layers of "/", "/a", and "/a/file" included in "/a/file" for the access request source identification information "request source ID: 1" Note that when the processing unit 12 has confirmed that a certain access request source does not have the access authority to "/a/file" on the basis of the meta information 31, the processing unit 12 creates history information indicating that it has been confirmed that the access request source does not have the access authority to "/a/file".

By creating the history information 32, confirmation of the access authority may be made efficient as follows.

When accessing a certain file, the client device 50 transmits the access request for inquiring about the access authority based on the history information to the information processing device that manages the meta information of the appropriate file. Then, when receiving a response that the appropriate history information has not been created from the information processing device, the client device 50 makes an inquiry about individual access authority based on the meta information of from the higher directory to the appropriate file, for example. Alternatively, it is also conceivable that the client device 50 inquires of an Intermediate directory of a layer between the higher directory and the appropriate file about the access authority based on the history information. In that case, when any of the information processing devices collectively confirms that the access request source has the access authority from the higher directory to an intermediate directory according to the history information, the client device 50 makes an inquiry about individual access authority based on the meta information of from the intermediate directory to the requested file. The inquiry about the access authority regarding the higher directory or the intermediate directory may be performed by the information processing device 10 that has received the access request.

For example, when trying to access the file 41 from the client device 50, the client device 50 specifies "/a/file" and "request source ID: 1" and transmits the access request for making an inquiry about the access authority based on the history information to the information processing device 10. The processing unit 12 determines that it has been confirmed that the access request source has the access authority in all the layers included in "/a/file", for "/a/file" and "request source ID: 1", by referring to the history information 32 in response to the access request. That is, the processing unit 12 collectively confirms that the access request source has the access authority for all the layers included in "/a/file" on the basis of the history information 32. Then, the processing unit 12 transmits the storage address of the file 41 to the client device 50 on the basis of the meta information 31. In this way, the confirmation of the individual access authority regarding each of the higher directories "/" and "/a" based on the meta information 31a and 31b is omitted. This improves the access performance of the client device 50 to the file 41. For example, the access of the client device 50 to the file 41 may be speeded up.

Furthermore, if the access right confirmation history of the confirmation result of the access authority of the access request source is stored for all files, the capacity of the storage unit (for example, the storage unit 11) of each information processing device or the storage device 30, 30a, or 30b, which is the storage destination of the access right confirmation history, may be compressed. Therefore, the processing unit 12 determines whether to save the access right confirmation history on the basis of the access history (for example, the access count or the access frequency) for a file. As a result, for example, the access right confirmation history can be saved only for files that are relatively frequently accessed, the access performance is improved, and the capacity of the storage unit of each information processing device or the storage device 30, 30a, or 30b, which is the storage destination of the access right confirmation history, may be saved.

As described above, according to the information processing system 1, the access authority may be efficiently managed.

As described above, the information processing devices 10a and 10b have a similar function to the information processing device 10. For example, the information processing device 10a stores, in the storage device 30a, history information 32a indicating the confirmation result of the access authority for all the layers included in the directory "/a" according to the access count to "/a", responding to the inquiry about the access authority of the access request source to "/a". Similarly, the information processing device 10b stores, in the storage device 30b, history information 32b indicating the confirmation result of the access authority of the access request source for the directory managed by the information processing device 10b itself. Note that, for the root directory "/", the access authority may be confirmed on the basis of the access authority for each access request source included in the existing meta information 31b. Therefore, the history information need not be created for the root directory "/".

Hereinafter, the functions of the information processing system 1 will be described in more detail by exemplifying a more specific system.

Second Embodiment

Next, a second embodiment wilt be described.

Figure 2:
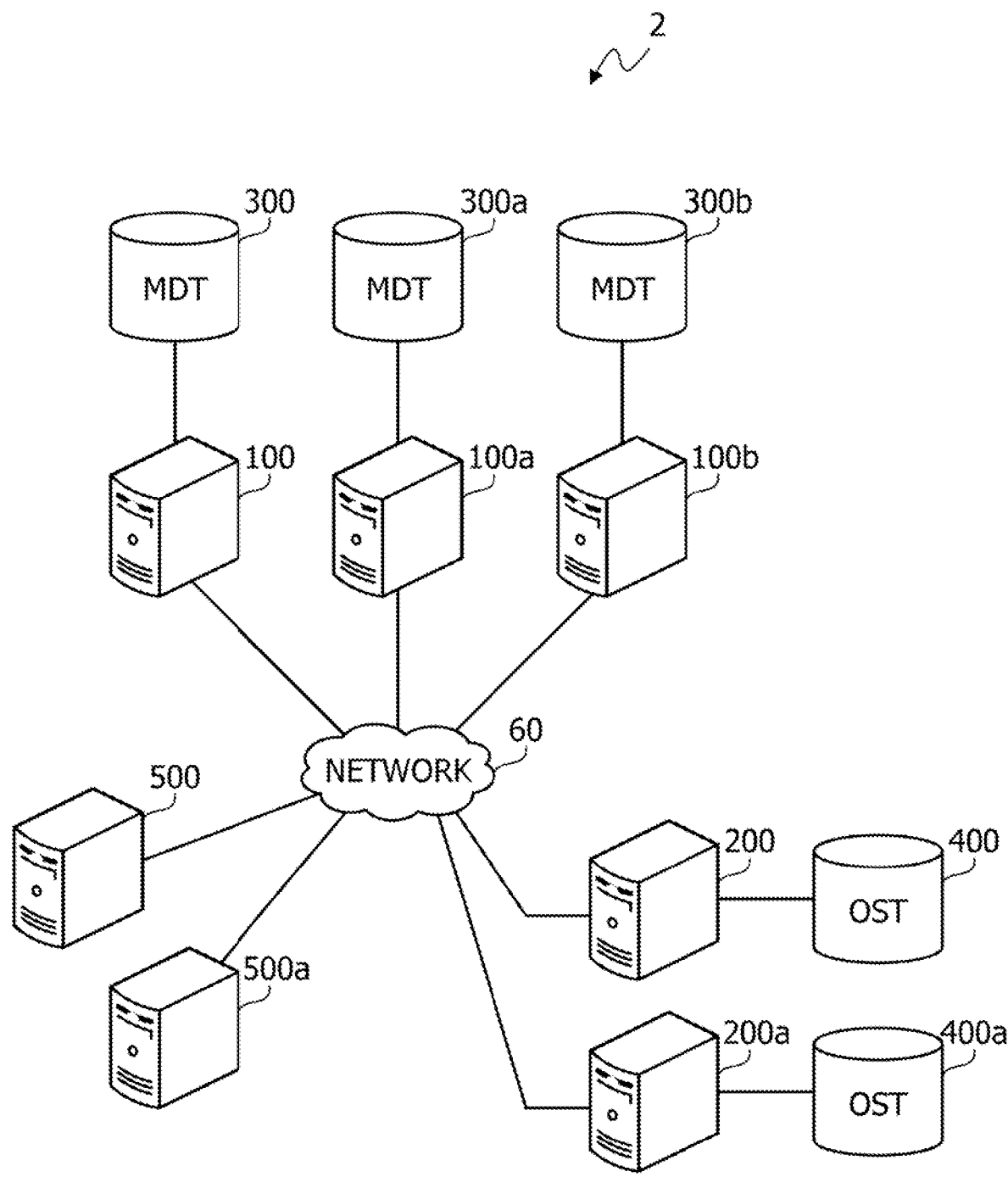
FIG. 2 is a diagram illustrating an example of an information processing system according to a second embodiment.

FIG. 2 is a diagram illustrating an example of an information processing system according to a second embodiment.

An information processing system 2 includes meta data servers (MDSs) 100, 100a, and 100b, object storage servers (OSSs) 200 and 200a, meta data targets (MDTs) 300, 300a, and 300b, object storage targets (OSTs) 400 and 400a, and clients 500 and 500a.

The MDSs 100, 100a, and 100b, the OSSs 200 and 200a, the MDTs 300, 300a, and 300b, the OSTs 400 and 400a, and clients 500 and 500a are connected to a network 60. The network 60 is, for example, a local area network (LAN). The clients 500 and 500a may be connected to the network 60 via a wide area network (WAN) or the Internet.

The MDSs 100, 100a, and 100b, the OSSs 200 and 200a, the MDTs 300, 300a, and 300b, and the OSTs 400 and 400a provide a distributed file system.

The MDSs 100, 100a, and 100b are server computers that manage file metadata. The MDSs 100, 100a, and 100b are respectively connected to the MDTs 300, 300a, and 300b. The MDTs 300, 300a, and 300b are storage devices that store metadata. The MDTs 300, 300a, and 300b are implemented by storage devices such as HDDs or solid state drives (SSDs). The MDTs 300, 300a, and 300b may be respectively incorporated in the MDSs 100, 100a, and 100b. The metadata includes information of access authority of an access request source for a file. The MDSs 100, 100a, and 100b confirms presence or absence of the access authority of the access request source for the appropriate file on the basis of the meta information. Note that, in the following description, the "access authority" may be described as "access right".

The OSSs 200 and 200a are server computers that manage an object that Is a body of a file. The OSSs 200 and 200a are respectively connected to the OSTs 400 and 400a. The OSTs 400 and 400a are storage devices that store the object. The OSTs 400 and 400*a* are implemented by storage devices such as HDDs or SSDs. The OSTs 400 and 400*a* may be respectively incorporated in the OSSs 200 and 200*a*.

The clients 500 and 500*a* are client computers that execute an application used by a user. The application of the clients 500 and 500*a* executes processing using a file stored in the OSTs 400 and 400*a*. When trying to access a file stored in the OST 400 or 400*a*, the client 500 or 500*a* first acquires a storage address of the file from the MDS 100, 100*a*, or 100*b*. The client 500 or 500*a* transmits an acquisition request for the appropriate file to the OSS 200 or 200*a* on the basis of the acquired storage address and acquire the appropriate file from the OSS 200 or 200*a*.

Here, the MDSs 100, 100*a*, and 100*b* are examples of the information processing devices 10, 10*a*, and 10*b* of the first embodiment. The OSSs 200 and 200*a* are examples of the information processing devices 20 and 20*a* of the first embodiment. The MDTs 300, 300*a*, and 300*b* are examples of the storage device 30, 30*a*, and 30*b* of the first embodiment. The OSTs 400 and 400*a* are examples of the storage devices 40 and 40*a* of the first embodiment. The clients 500 and 500*a* are examples of the client device 50 of the first embodiment.

Figure 3:
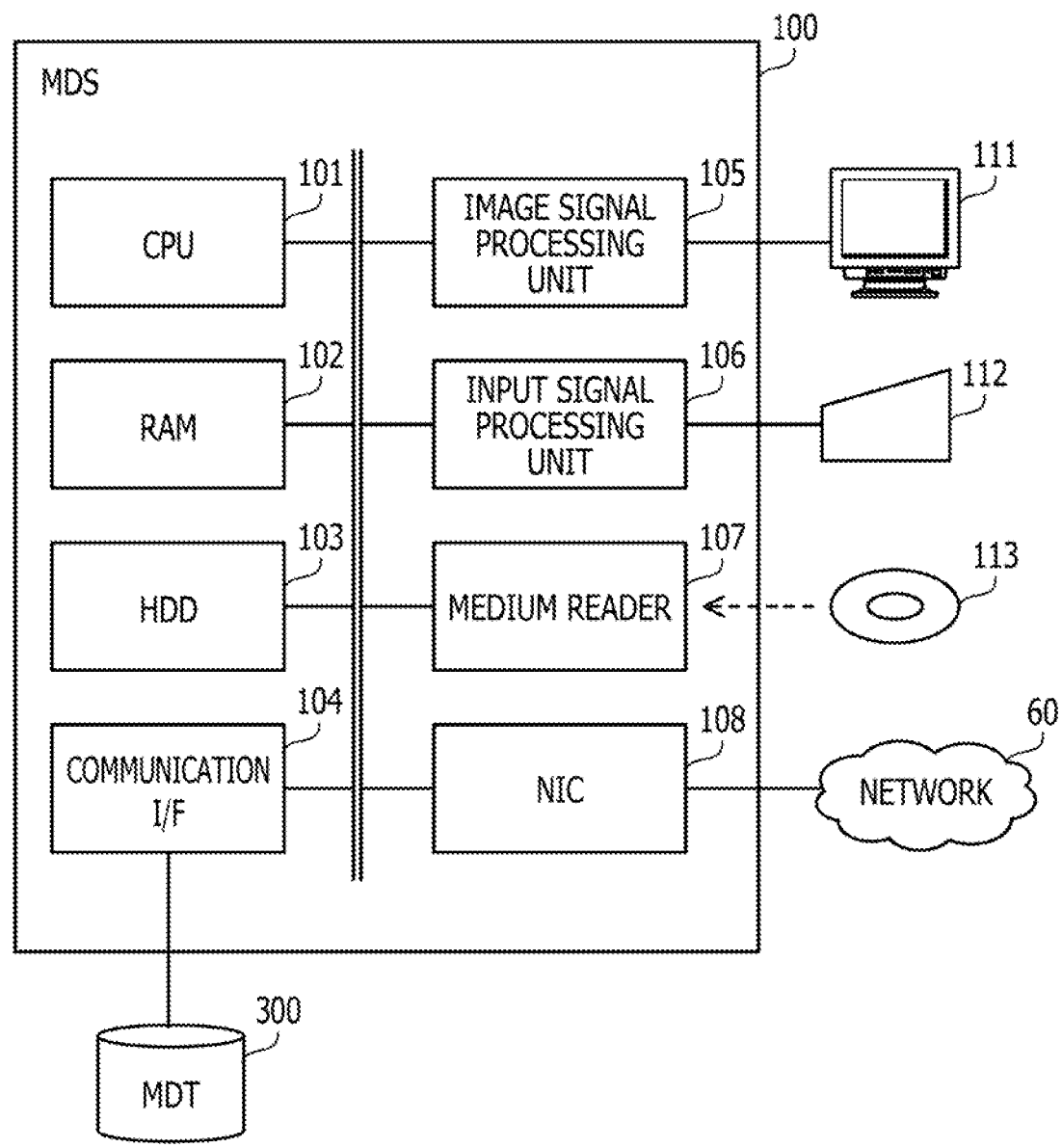
FIG. 3 is a diagram illustrating a hardware example of an MDS.

FIG. 3 is a diagram illustrating a hardware example of the MDS.

The MDS 100 includes a CPU 101, a RAM 102, an HDD 103, a connection interface (IF) 104, an image signal processing unit 105, an input signal processing unit 106, a medium reader 107, and a network interface card (NIC) 108. Note that the CPU 101 corresponds to the processing unit 12 of the first embodiment. The RAM 102 or the HDD 103 corresponds to the storage unit 11 of the first embodiment.

The CPU 101 is a processor that executes a program instruction. The CPU 101 loads at least part of a program and data stored in the HDD 103 into the RAM 102 and executes the program. Note that the CPU 101 may include a plurality of processor cores. Furthermore, the MDS 100 may include a plurality of processors. The processing to be described below may be executed in parallel using a plurality of processors or processor cores. Furthermore, a set of a plurality of processors may be referred to as a "multiprocessor" or simply a "processor".

The RAM 102 is a volatile semiconductor memory that temporarily stores the program executed by the CPU 101 and the data used by the CPU 101 for operations. Note that the MDS 100 may include any type of memory other than the RAM or may include a plurality of memories.

The HDD 103 is a non-volatile storage device that stores a program of software such as an operating system (OS), middleware, and application software, and data. Note that the MDS 100 may include another type of storage device such as a flash memory or an SSD, and may include a plurality of nonvolatile storage devices.

The connection IF 104 is a communication interface connected to the MDT 300. As the connection IF 104, for example, an interface such as a fiber channel or serial attached SCSI (SAS) (SCSI is an abbreviation for small computer system interface) is used.

The image signal processing unit 105 outputs an image on a display 111 connected to the MDS 100 according to a command from the CPU 101. As the display 111, any type of display such as a cathode ray tube (CRT) display, a liquid crystal display (LCD), a plasma display, or an organic electro-luminescence (OEL) display may be used.

The input signal processing unit 106 acquires an input signal from an input device 112 connected to the MDS 100 and outputs the input signal to the CPU 101. As the input device 112, a pointing device such as a mouse, a touch panel, a touch pad, or a trackball, a keyboard, a remote controller, a button switch, or the like may be used. Furthermore, a plurality of types of input devices may be connected to the MDS 100.

The medium reader 107 is a reading device that reads the program or data recorded on a recording medium 113. As the recording medium 113, for example, a magnetic disk, an optical disk, a magneto-optical (MO) disk, a semiconductor memory, or the like may be used. Examples of the magnetic disk include a flexible disk (FD) and an HDD. Examples of the optical disk include a compact disc (CD) and a digital versatile disc (DVD).

The medium reader 107 copies, for example, the program and data read from the recording medium 113 to another recording medium such as the RAM 102 or the HDD 103. The read program is executed by the CPU 101, for example. Note that the recording medium 113 may be a portable recording medium, and may be used for distribution of the program and data. Furthermore, the recording medium 113 and the HDD 103 may be sometimes referred to as computer-readable recording media.

The NIC 108 is an interface that is connected to the network 60 and communicates with other computers via the network 60. The NIC 108 is connected to a communication device such as a switch or a router by a cable, for example.

Note that the MDSs 100*a* and 100*b*, the OSSs 200 and 200*a*, and the clients 500 and 500*a* are also implemented by hardware similar to MDS 100.

FIG. 4 is a diagram illustrating an example of distributed arrangement of metadata.

A directory structure D1 illustrates an example of a directory tree structure. The directory structure D1 has three layers. The first layer is the highest layer. The directory belonging to the first layer is "/" (root).

The second layer is one layer below the highest layer. The directories belonging to the second layer are "/0", "/1" and "/2".

The third layer is one layer below the second layer. The files belonging to the third layer are "/0/0", "/0/1", "/0/2", "/1/0", and "/1/1".

Here, "/0/0", "/0/1", and "/0/2" are files located one level below the directory "/0", The files "/1/0" and "/1/1" are files located one level below the directory "/1". Therefore, for example, all the higher directories of the file "/0/0" are "/" and "/0". Furthermore, for example, all the higher directories of the file "/1/0" are "/" and "/1".

In the distributed file system, the metadata of each file is distributed and stored in the MDTs 300, 300*a*, and 300*b*. For example, the metadata of the directories "/" and "/2" and the file "/0/2" are stored in the MDT 300. The metadata of the directory "/0" and the files "/0/0" and "/1/0" are stored in the MDT 300*a*. The metadata of the directory "/1" and the files "/0/1" and "/1/1" are stored in the MDT 300*b*.

As described above, the metadata of the higher directory of a certain file is not necessarily stored in the same MDT as the metadata of the appropriate file. That is, the metadata of the higher directory of a certain file may be stored in the MDT different from the metadata of the appropriate file.

Which MDT the metadata is to be stored in is determined by a hash value of a full path directory name or of a full path file name corresponding to the metadata.

Figure 5:
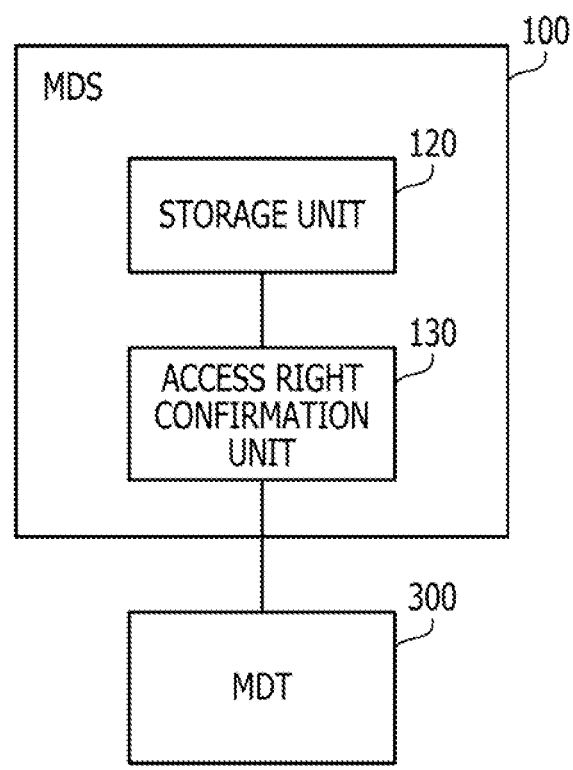
FIG. 5 is a diagram illustrating a function example of the MDS.

FIG. 5 is a diagram illustrating a function example of the MDS.

The MDS 100 includes a storage unit 120 and an access right confirmation unit 130. A storage area of the RAM 102 or the HDD 103 is used as the storage unit 120. The access right confirmation unit 130 is implemented by the CPU 101.

The storage unit 120 stores the access count to the metadata managed by the MDS 100. The access count to the metadata corresponds to the access count to the file corresponding to the metadata.

The access right confirmation unit 130 receives the access request for a file from the client 500 or 500a. The access request includes the full path file name of the appropriate file and the identification information of the access request source. The identification information of the access request source is, for example, a user ID of a user who operates the client 500 or 500a and a group ID corresponding to a group to which the user belongs. For example, the group corresponds to an organization to which the user belongs. The access right confirmation unit 130 confirms the presence or absence of the access right of the access request source to the requested file on the basis of the metadata stored in the MDT 300.

In the case where the access request source has the access right, the access right confirmation unit 130 responds to the client 500 or 500a with the presence of the access right. The access right confirmation unit 130 may respond with the presence of the access right together with the storage address of the requested file.

Furthermore, the access right confirmation unit 130 counts the access count to the metadata managed by the MDS 100 and records the access count in the storage unit 120. The access right confirmation unit 130 creates the access right confirmation history indicating the confirmation result of the access right to the file to which the access request has been made according to the access count for the metadata. The access right confirmation unit 130 confirms the access right on the basis of the created access right confirmation history, for the access request to the file afterward.

Note that the MDSs 100a and 100b have similar functions to the MDS 100.

Figure 6:
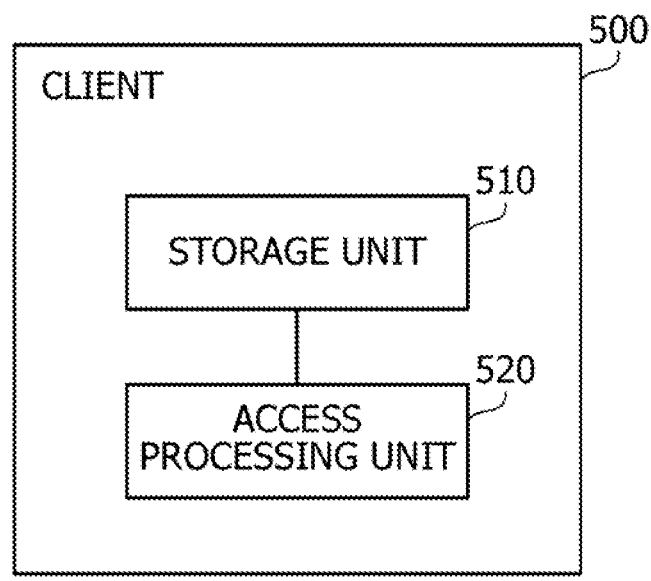
FIG. 6 is a diagram illustrating a function example of a client.

FIG. 6 is a diagram illustrating a function example of the client.

The client 500 includes a storage unit 510 and an access processing unit 520. As the storage unit 510, the storage area of the RAM or the HDD of the client 500 is used. The access processing unit 520 is implemented by the CPU of file client 500.

Storage unit 510 stores a hash table. The hash table is a table in which hash values of a full path directory name and a full path file name are associated with the identification information of the MDS that manages the metadata.

The access processing unit 520 executes access processing for a file. When trying to access a certain file, the access processing unit 520 obtains the hash value of the full path file name of the file. The access processing unit 520 specifies the MDS corresponding to the obtained hash value by referring to the hash table stored in the storage unit 510, and obtains the storage address of the file from the MDS. At this time, each MDS can confirm the access right of the access request source not only to the file but also to the higher directories of the file. In the case where it is confirmed that the access request source has the access right to all the higher directories of the file and the file, the access processing unit 520 can acquire the storage address of the file from the MDS.

When the access processing unit 520 acquires the storage address of the requested file, the access processing unit 520 transmits an acquisition request for the appropriate fife to the OSS indicated by the storage address and acquires the file from the OSS.

Figure 7:
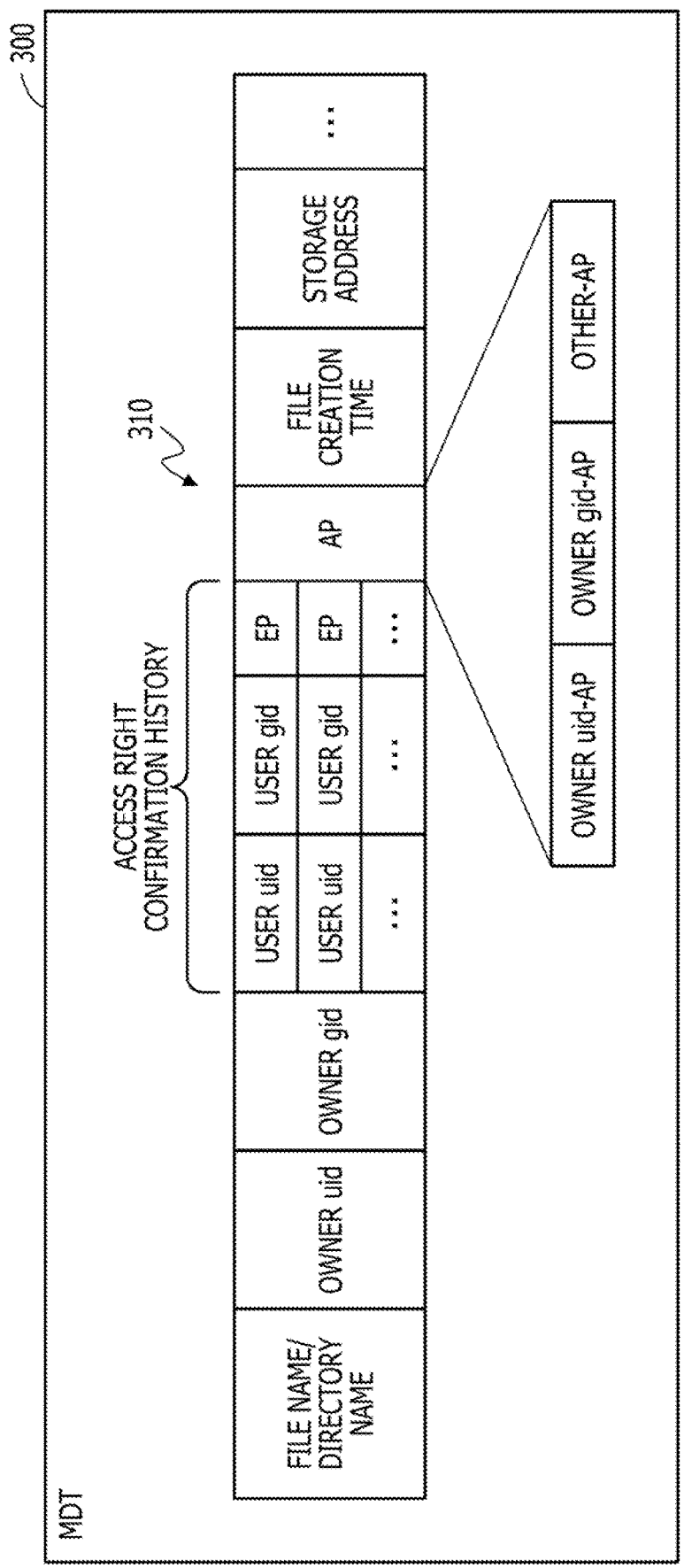
FIG. 7 is a diagram illustrating an example of metadata.

Note that the client 500a has a similar function to the client 500,

FIG. 7 is a diagram illustrating an example of the metadata.

The MDT 300 stores metadata 310. The metadata 310 exists for each file name or for each directory name. The metadata 310 includes fields of file name/directory name, owner uid (user identifier), owner gid (group identifier), access right confirmation history, access permission (AP), file creation time, and storage address. The metadata 310 includes fields of other data but the fields of other data are omitted as in FIG. 7.

In the field of file name/directory name, a full path file name or a full path directory name is recorded. In the field of owner uid, an owner uid of a file or of a directory is recorded, uid represents a user ID. In the field of owner gid, an owner gid of a file or of a directory is recorded, gid represents a group ID.

In the field of access right confirmation history, a confirmation history of the access right to the appropriate file or directory is recorded as a value of effective permission (EP). The confirmation history of the access right is recorded for each uid (referred to as "user uid") of a user and for each gid (referred to as "user gid") of the user who has accessed the metadata of the appropriate file or directory. More specifically, EP=1 is recorded in the case where it has been confirmed in the past that the set of the user uid and the user gid has the access right to all of the highest directory to the appropriate file or directory. Furthermore, EP=0 is recorded in the case where it has been confirmed in the past that the set of the user uid and the user gid does not have the access right to at least one of the highest directory to the appropriate file or directory.

Here, in the case where at least one of the set of the user uid and the user gid, which indicates the access request source, has the access right to a certain file or directory, it is determined that the access request source has the access right to the appropriate file or directory.

In the field of AP, the individual access right to the appropriate file or directory is recorded. The AP represents single access right to the appropriate file or directory and does not represent the access right to a directory higher than the file or directory. Examples of toe AP include owner uid-AP, owner gid-AP, and other-AP. The owner uid-AP is AP of a user who owns the file. The owner gid-AP is AP of a group who owns toe file. The other-AP is AP of a user other than the owner and a group other than the owner.

The AP includes read authority, write authority, and execution authority. The read authority is access right to reading a file. The write authority is access right to writing a file. The execution authority is access right indicating whether execution of a file is permitted in toe case where a definition destination is the file. The execution authority is access right indicating whether an access to a directory or file under an appropriate directory is permitted in the case where the definition destination is toe directory. If write is permitted to a certain access request source, read is also permitted. Furthermore, even if both the read and write of a certain directory are not permitted for a certain access request source, the access request source can access a file or directory under the certain directory if the access request source has the execution authority to the certain directory. The read authority, the write authority, and the execution authority are each represented by a value of 0 or 1, where "0" represents absence of authority and "1" represents presence of authority.

The access request transmitted by toe client 500 or 500a may include information indicating the current request is either a read type or a write type. For example, the presence or absence of the access right can be confirmed on the basis of the read type or the write type included in the access request, and the read authority, write authority, and execution authority set to the AP.

In the field of file creation time, a creation time of an appropriate file is recorded. In the field of storage address, a storage address of the appropriate file is recorded. The storage address indicates, for example, an address of the OSS that manages the substance of the appropriate file.

Here, the access processing unit 520 selectively uses, for the MDSs 100, 100a, and 100b, a confirmation inquiry about the access right based on the AP and a confirmation inquiry about the access right based on the EP. The access processing unit 520 may provide information indicating a confirmation type as to whether the access request is the confirmation inquiry about the access right based on the AP or the confirmation inquiry about the access right based on the EP to the access request to be transmitted to the MDSs 100, 100a, and 100b. Then, the MDSs 100, 100a, and 100b can confirm the access right based on the AP or the access right based on the EP according to the confirmation type included in the received access request. The confirmation of the access right based on the EP is confirmation of the access right using the access right confirmation history. The information indicating the confirmation type may be similarly provided to the confirmation inquiry about the access right in the case where the MDSs 100, 100a, and 100b inquire of another MDS about the access right instead of the client 500.

FIG. 8 is a diagram illustrating a storage example of EP in the metadata.

Metadata 311 is obtained by extracting a part of the metadata 310. In FIG. 8, fields in the metadata 310 other than the fields of file name/directory name and of access right confirmation history are not illustrated.

For example, in the metadata 311, the user uid "uid1", the user gid "gid1", and EP "1" are recorded for the directory "/dir1". The record indicates that the presence of the access right of the access request source with "uid1" and "gid1" has been confirmed in the past to all the directories "/" and "/dir1" included in the full path "/dir1".

Furthermore, in the metadata 311, the user uid "uid2", the user gid "gid1", and EP "0" are recorded for the directory "/dir1". The record indicates that the absence of the access right of the access request source with "uid2" and "gid1" has been confirmed in the past to at least one of the directories "/" and "/dir1" included in the directory "/dir1".

Furthermore, in the metadata 311, the user uid "uid3", the user gid "gid2", and EP "1" are recorded for the file "/dir2/file1". The record indicates that the presence of the access right of the access request source with "uid3" and "gid2" has been confirmed in the past to all the directories "/" and "/dir2" and the file "/dir2/file1" included in the full path "/dir2/file1".

Figure 9:
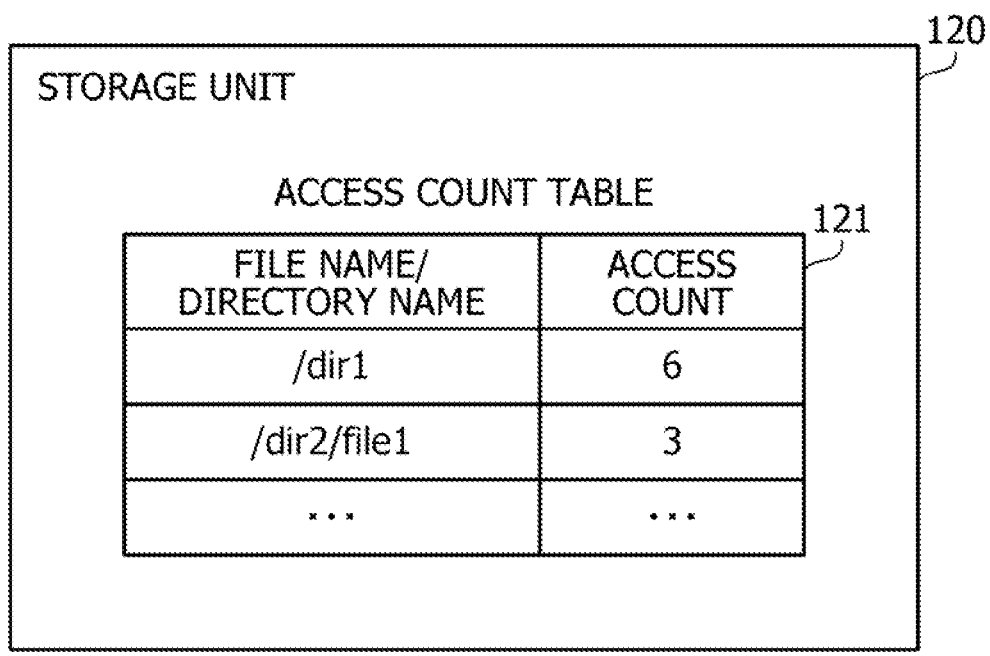
FIG. 9 is a diagram illustrating an example of an access count table.

Note that, in the case where the access right is confirmed by AP according to the read or write type for a file or a directory, EP may be stored in the metadata 310 for each read or write type for the file or directory, FIG. 9 is a diagram illustrating an example of an access count table.

An access count table 121 is stored in the storage unit 120. The access count table 121 is a table for managing the access count to the metadata stored in the MDT 300. The access count table 121 is updated by the access right confirmation unit 130. The access count table 121 includes items of file name/directory name and access count.

In the item of file name/directory name, a full path file name or a full path directory name is recorded. In the item of access count, the access count to the metadata corresponding to the file name or the directory name is recorded.

For example, in the access count table 121, the access count "6" is recorded for the directory name "/dir1". This record indicates that a total of six access requests has been received for the metadata corresponding to the directory name "/dir1".

Furthermore, in the access count table 121, the access count "3" is recorded for the fife name "/dir2/file1". This record indicates that a total of three access requests has been received for the metadata corresponding to the file name "/dir2/file1".

Note that the access count in the access count table 121 may be recorded in the metadata 310. For example, the MDT 300 may reflect the content of the access count table 121 stored in the storage unit 120 on the access count of each file or directory in the metadata 310 at predetermined timing such as when the HOT 300 is shut down.

Figure 10:
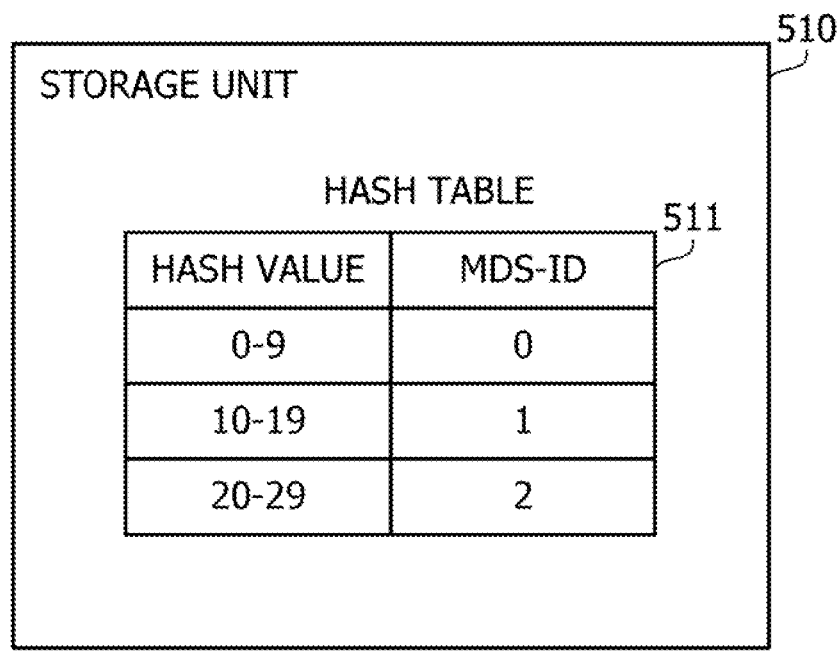
FIG. 10 is a diagram illustrating an example of a hash table.

FIG. 10 is a diagram illustrating an example of the hash table.

A hash table 511 is stored in the storage unit 510 in advance. The hash table 511 includes items of hash value and MDS-ID.

In the item of hash value, the hash value is registered. The hash value is obtained by inputting the full path file name and the full path directory name into a predetermined hash function. In the item of MDS-ID, an MDS-ID is registered. The MDS-ID is identification information of the MDS.

For example, in the hash table 511, a record with the hash value of "0-9" and the MDS-ID of "0" is recorded. This record indicates that the MDS that manages the metadata corresponding to the file name and the directory name of the hash value is an MDS with the MDS-ID "0" in the case where the hash value belongs to the range from "0" to "9". The MDS with the MDS-ID "0" is, for example, the MDS 100.

Furthermore, in the hash table 511, a record with the hash value of "10-19" and the MDS-ID of "1" is recorded. This record indicates that the MDS that manages the metadata corresponding to the file name and the directory name of the hash value is an MDS with the MDS-ID "1" in the case where the hash value belongs to the range from "10" to "19". The MDS with the MDS-ID "1" is, for example, the MDS 100a.

Furthermore, in the hash table 511, a record with the hash value of "20-29" and the MDS-ID of "2" is recorded. This record indicates that the MDS that manages the metadata corresponding to the file name and the directory name of the hash value is an MDS with the MDS-ID "2" in the case where the hash value belongs to the range from: "20" to "29". The MDS with the MDS-ID "2" is, for example, the MDS 100b.

Next, a processing procedure in the information processing system 2 will be described.

First, a file access flow by the client 500 will be described.

Figure 11:
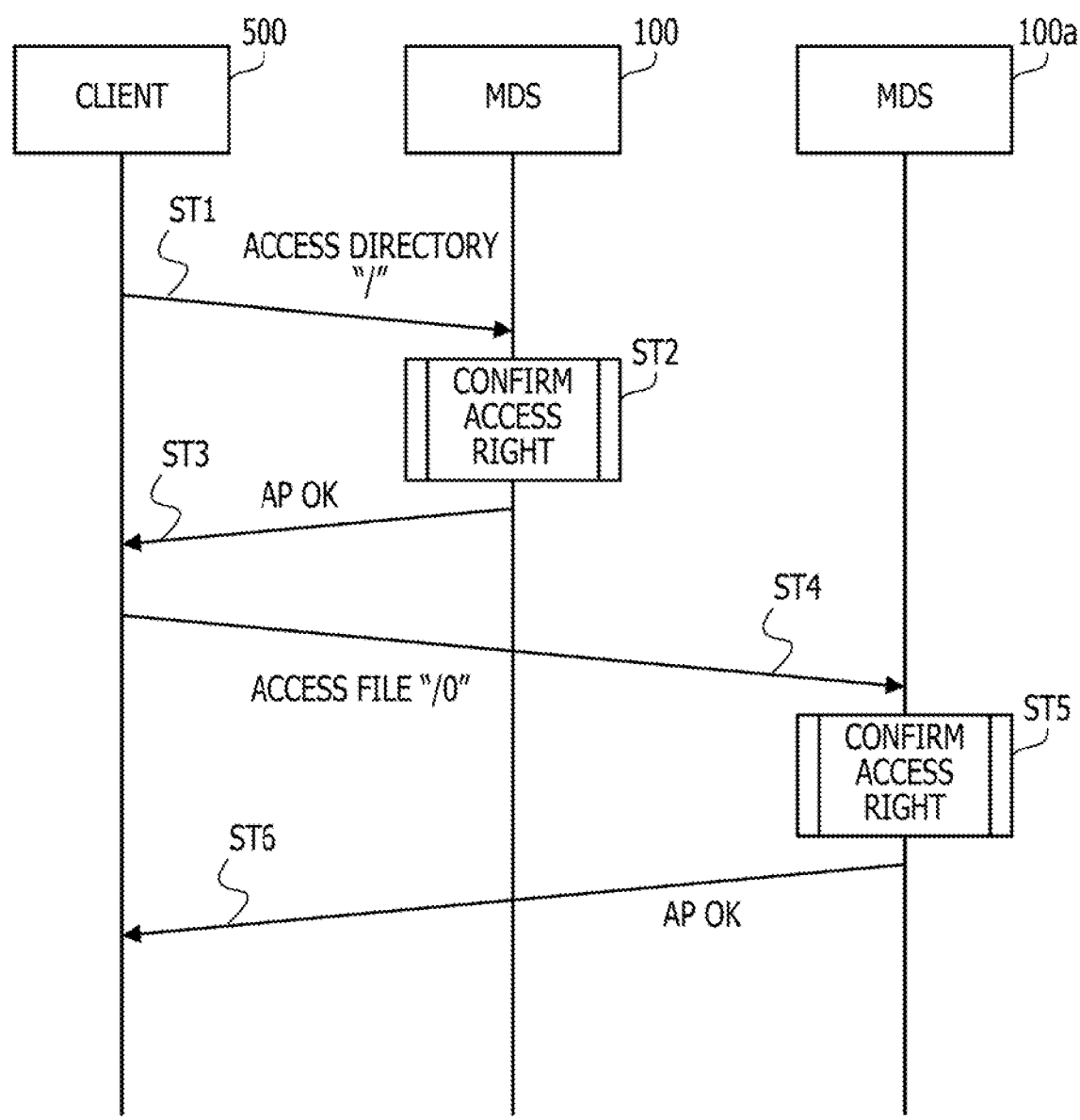
FIG. 11 is a sequence diagram illustrating an example of providing a storage address of a file.

FIG. 11 is a sequence diagram: illustrating an example of providing a storage address of a file.

As an example, a case where the client 500 accesses the file "/0" will be described. The client 500a accesses the file similarly to the client 500.

(ST1) The client 500 specifies "/" which is the higher directory of the file "/0", on the basis of the full path file name "/0". The client 500 specifies the MDS 100 that manages the metadata of "/" on the basis of the hash value of "/" and transmits the access request to the directory "/" to the MDS 100. The access request includes the full path directory name "/" and the identification information of the access request source.

(ST2) The MDS 100 receives the access request from the client 500 and executes access right confirmation processing. Details of the access right confirmation processing will be described below.

(ST3) In step ST2, when the MDS 100 confirms "AP OK" of the access request source, that is, the presence of the access right to "/", the MDS 100 responds to the client 500 with "AP OK".

(ST4) The client 500 receives the response of "AP OK" and confirms the presence of the access right to "/", Then, the client 500 specifies the MDS 100a that manages the metadata of the requested file "/0" on the basis of the hash value of the file "/0" in the next layer of "/", end transmits the access request to the file "/0" to the MDS 100a. Here, the access request includes, for example, the full path file name "/0", the identification information of the access request source, and information indicating that the file is a file to be acquired from a final request destination, that is, from: the OSS.

(ST5) The MDS 100a receives the access request from the client 500 and executes the access right confirmation processing. Details of the access right confirmation processing will be described below.

(ST6) In step ST5, when the MDS 100a confirms "AP OK" of the access request source, that is, the presence of the access right to "/0", the MDS 100a responds to the client 500 with "AP OK". At this time, since the file "/0" is the final request destination, the MDS 100a provides the client 500 with the storage address of the file "/0".

The client 500 acquires an object of the file "/0" from the OSS corresponding to the storage address on the basis of the storage address acquired from the MDS 100a.

The client 500 transmits the access request to the MDS in order from the highest directory to a lower directory, regarding the file or directory of the final request destination. When the client 500 receives a response indicating the absence of the access right to a directory of a middle layer from the MDS, the client 500 determines that the file or directory of the final request destination is not accessible at the time and does not transmit the access request regarding a lower directory than the middle layer.

Figure 12:
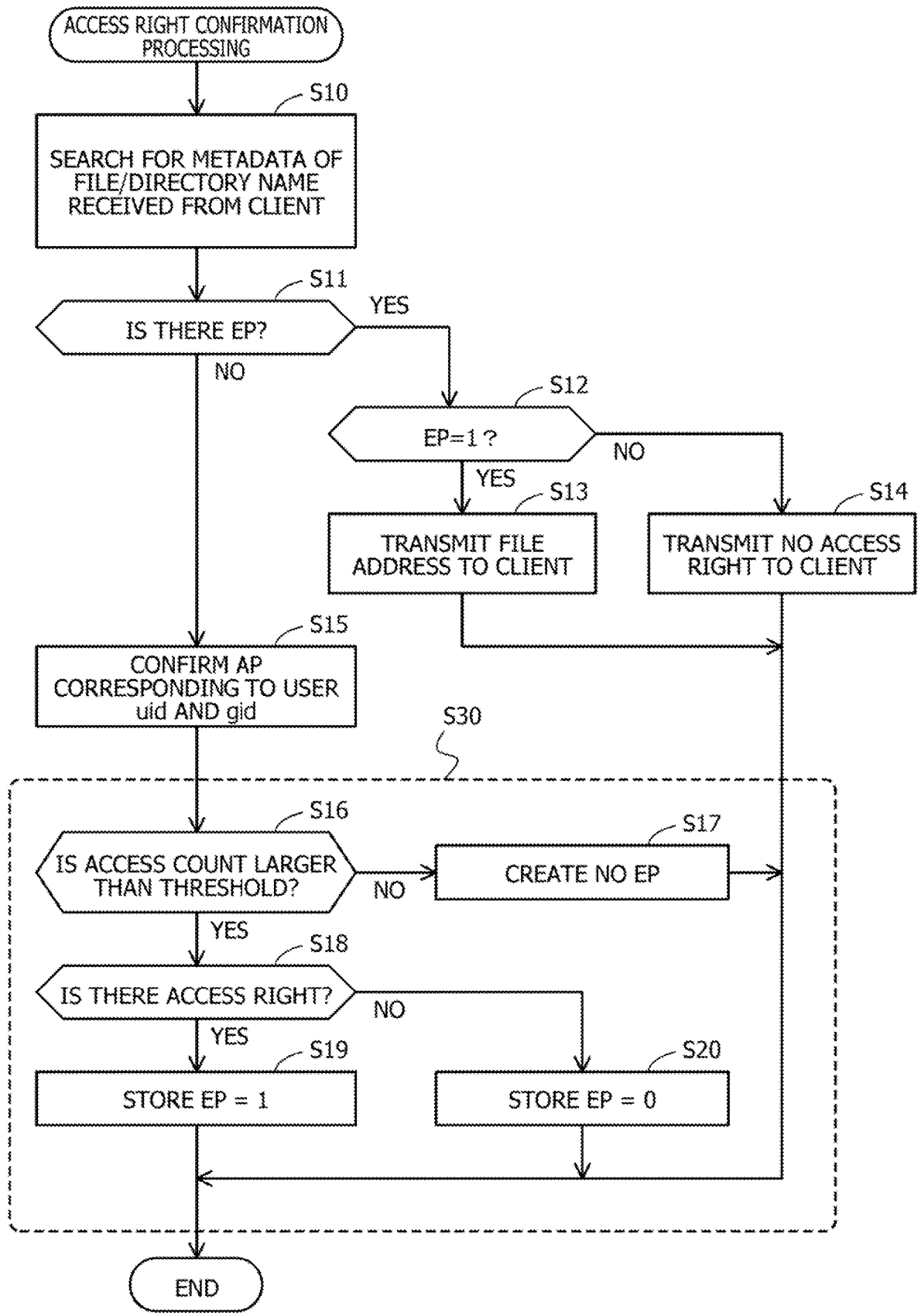
FIG. 12 is a flowchart illustrating an example of access right confirmation processing by the MDS.

FIG. 12 is a flowchart illustrating an example of access right confirmation processing by the MDS.

The access right confirmation processing corresponds to steps ST2 and ST5. Note that step ST5 is executed by the MDS 100a.

(S10) The access right confirmation unit 130 receives the access request for a file/directory from the client 500. The access right confirmation unit 130 updates the access count table 121 by incrementing the access count for the file/directory name included in the access request. The access right confirmation unit 130 searches the MDT 300 for the metadata of the file/directory name included in the access request.

(S11) The access right confirmation unit 130 determines whether the retrieved metadata has EP corresponding to the access request source of this time. In the case where the retrieved metadata has EP corresponding to the access request source, the processing proceeds to step S12. In the case where the retrieved metadata has no EP corresponding to the access request source, the processing proceeds to step S15.

(S12) The access right confirmation unit 130 determines whether the EP satisfies EP=1 for the access request source. In the case of EP=1, the processing proceeds to step S13. In the case of EP=0, the processing proceeds to step S14.

(S13) The access right confirmation unit 130 transmits the storage address of the file or directory to the client 500. Note that the access request of this time may not be the access request to the final request destination. In that case, the access right confirmation unit 130 may respond with the presence of the access right of the access request source to all the higher directories of the file or directory and the file and directory without transmitting the storage address. Then, the access right confirmation processing ends. Here, in the drawings, "file or directory" may be simply written as "file".

(S14) The access right confirmation unit 130 transmits the absence of the access right to the client 500. Then, the access right confirmation processing ends.

(S15) The access right confirmation unit 130 confirms AP corresponding to the user uid and the user gid corresponding to the access request source of this time by referring to the metadata. In the case where the user uid and the user gid have the access right based on AP, the access right confirmation unit 130 responds to the client 500 with the presence of the access right. At this time, in the case where the access request destination of this time is the final request destination, the access right confirmation unit 130 responds to the client 500 with the storage address of the file or directory of the access request destination. Meanwhile, in the case where the user uid and the user gid have no access right based on AP, the access right confirmation unit 130 responds to the client 500 with the absence of the access right.

(S16) The access right confirmation unit 130 acquires the access count for the file/directory of the access request destination of this time by referring to the access count table 121. The access right confirmation unit 130 determines whether the acquired access count is larger than a threshold. In the case where the access count is larger than the threshold, the processing proceeds to step S18. In the case where the access count is less than or equal to the threshold, the processing proceeds to step S17.

(S17) The access right confirmation unit 130 determines not to create EP for the access request of this time. Then, the access right confirmation processing ends.

(S18) The access right confirmation unit 130 determines whether the presence of the access right based on AP has been confirmed in step S15. In the case where the presence of the access right has been confirmed, the processing proceeds to step S19. In the case where the absence of the access right has been confirmed, the processing proceeds to step S20.

(S19) The access right confirmation unit 130 records EP=1 in the metadata of the file or directory of the access request destination received from the client 500, for the user uid and the user gid of the access request source of this time. Then, the access right confirmation processing ends.

(S20) The access right confirmation unit 130 records EP=0 in the metadata of the file or directory of the access request destination received from the client 500, for the user uid and the user gid of the access request source of this time. Then, the access right confirmation processing ends.

As described above, when receiving the access request for a file, the access right confirmation unit 130 determines whether the access right confirmation history for the file and the access request source has been created. In the case where the access right confirmation history has been created, the access right confirmation unit 130 collectively confirms the presence or absence of the access right of the access request source to from the higher directories of the request file to the file on the basis of the access right confirmation history. Furthermore, in the case where the access right confirmation history has not been created, the access right confirmation unit 130 determines whether to create the access right confirmation history for the confirmation result of the access right of this time on the basis of the access count for the requested fife after confirming the presence of the access right based on AP.

Note that the access right confirmation unit 130 may perform the determination as to whether to create the access right confirmation history by comparing the access frequency for the requested file with a threshold. In this case, the access right confirmation unit 130 creates the access right confirmation history in the case where the access frequency is larger than the threshold, and does not create the access right confirmation history in the case where the access frequency is equal to or smaller than the threshold.

Here, the procedures in steps S16 to S20 are referred to as "EP creation control" processing. In the following description, the EP creation control processing may be referred to as step S30.

As described above, the access right confirmation unit 130 can collectively confirm the access right to the directories over a plurality of layers on the basis of EP by creating the EP. Therefore, a confirmation count of the access right in the MDSs 10G, 100a, and 100b may be reduced.

Figure 13A:
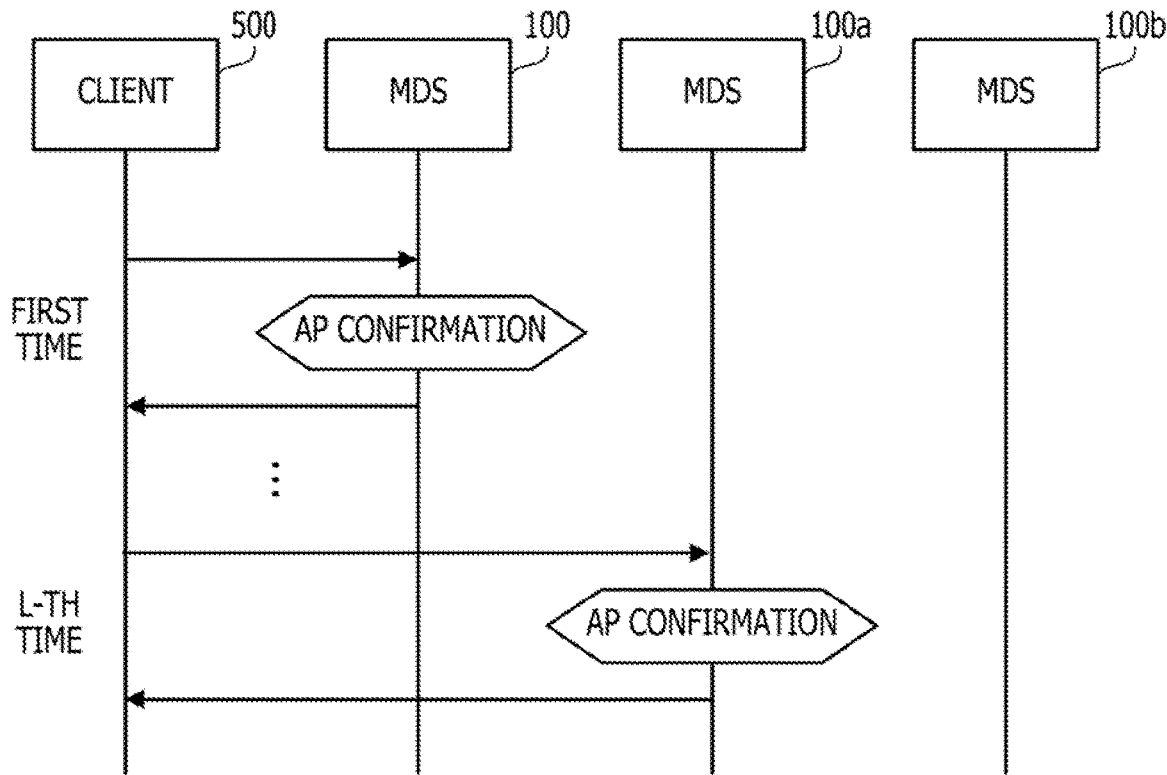
FIGS. 13A and 13B are diagrams illustrating reduction examples of an access right confirmation count.
Figure 13B:
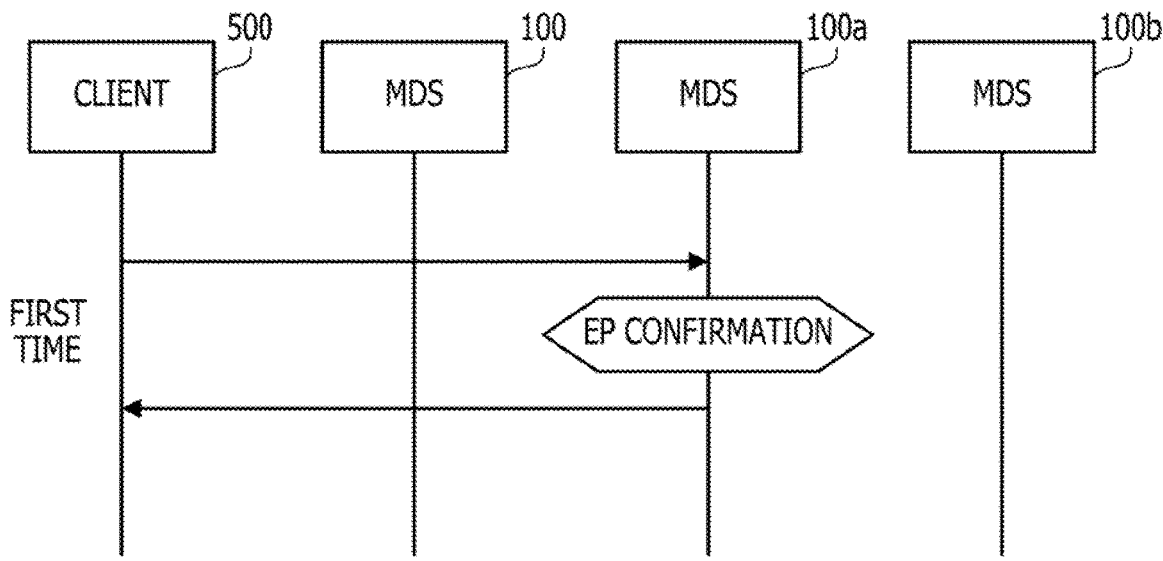

FIGS. 13A and 13B are diagrams illustrating reduction examples of an access right confirmation count, FIG. 13A illustrates an example of confirming the access right by AP. The MDSs 100, 100a, and 100b sequentially confirm the access right to higher directories of the file to be accessed by the client 500. For example, in the case where the file exists in an t layer of a directory tree, the MDSs 100, 100a, and 100b will confirm the access right a total of L times until providing the storage address of the file. The first time is confirmation of the access right to a root directory. The L-th time is confirmation of the access right to the file of the final request destination.

FIG. 13B illustrates an example of confirming the access right by EP. The MDS 100a responds with the presence or absence of the access right on the basis of EP of the file to be accessed by the client 500. The MDS 100a provides the client 500 with the storage address of the file when there is the access right. As described above, the MDSs 100, 100a, and 100b may confirm the access right based on EP to the file at least once.

As described above, the MDSs 100, 100a, and 100b efficiently manage the access right by EP. As a result, the confirmation count of the access right by the MDSs 100, 100a, and 100b is reduced, and the file access performance is improved. For example, the file access by the client 500 is accelerated.

Note that, in FIG. 13B, the client 500 may first acquire the confirmation result of the access right based on EP to the file or directory of the final request destination from the MDS 100a, and may execute the procedures illustrated in FIG. 11 in the case where there is no appropriate EP.

Moreover, the access right confirmation unit 130 saves EP for a file or directory with a relatively large access count but the access right confirmation unit 130 does not save EP for a file or directory with a relatively small access count. Thereby, an excessively large size of the metadata 310 may be suppressed and compression of capacities of the MDTs 300, 300a, and 300b by the access right confirmation history may be avoided.

Figure 14:
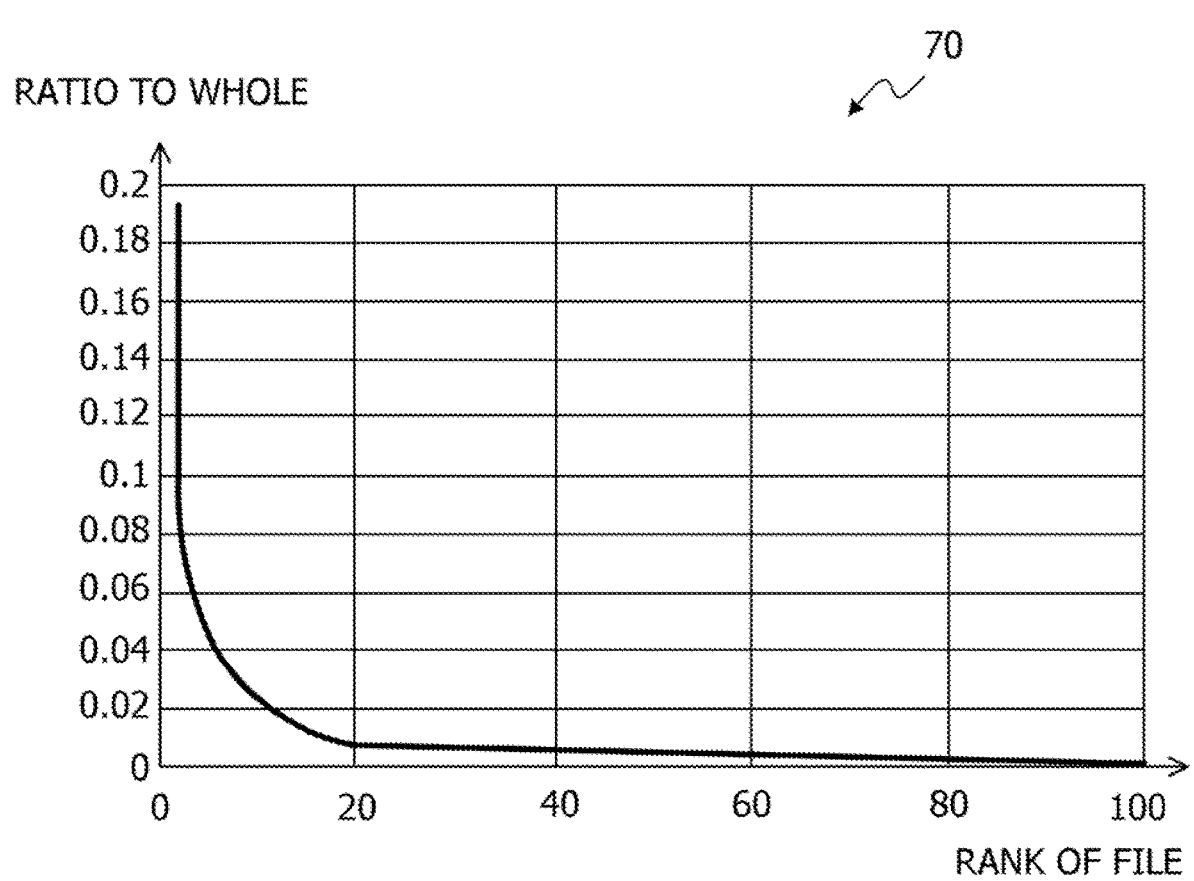
FIG. 14 is a diagram illustrating an example of a relationship according to Zipf's law.

For example, the threshold in step S16 is set in advance such that the file or directory for which EP is to be created is narrowed down to about higher 20% of the access count among all the files/directories. The reason is based on Zipf's law below, FIG. 14 is a diagram illustrating an example of a relationship according to Zipf's law.

Zipf's law is an empirical law formulated according to the fact that the ratio of an element with the k-th highest frequency to the whole is proportional to 1/k. According to Zipp's law, a ratio f of the k-th element to the whole is expressed by the expression (1), where H is the number of all elements and k is a rank.

$$f = \frac{\frac{1}{k}}{\sum_{n=1}^{N} \frac{1}{n}} \quad (1)$$

The ratio f of the k-th element to the whole is expressed by the expression (2), where N is the number of files and N=100.

$$f = \frac{\frac{1}{k}}{\sum_{n=1}^{100} \frac{1}{n}} = \frac{\frac{1}{k}}{\frac{1}{1} + \frac{1}{2} + \ldots + \frac{1}{100}} \quad (2)$$

A graph 70 is a graph of the expression (2), where a horizontal axis represents the rank k of the access count of a file and a vertical axis represents the ratio f to the whole. For example, a total percentage of top 10 is 56.46%. Furthermore, the total percentage of top 20 is 69.36%.

That is, a file or directory having a relatively small access count has a low probability of being used even if EP is held. Therefore, the access performance for files is improved by holding EP of files or directories having a relatively large access count white suppressing compression on the capacity of the MDT.

The access right confirmation unit 130 may periodically update the threshold in step S16. For example, it is conceivable that the access right confirmation unit 130 determines a threshold to be used in the next one cycle on the basis of the access count of each file or directory in immediately previous one cycle, in a predetermined cycle such as one week. In that case, the access right confirmation unit 130 may reset the access count of each fife in the access count table 121 to 0 when one cycle ends.

Figure 15:
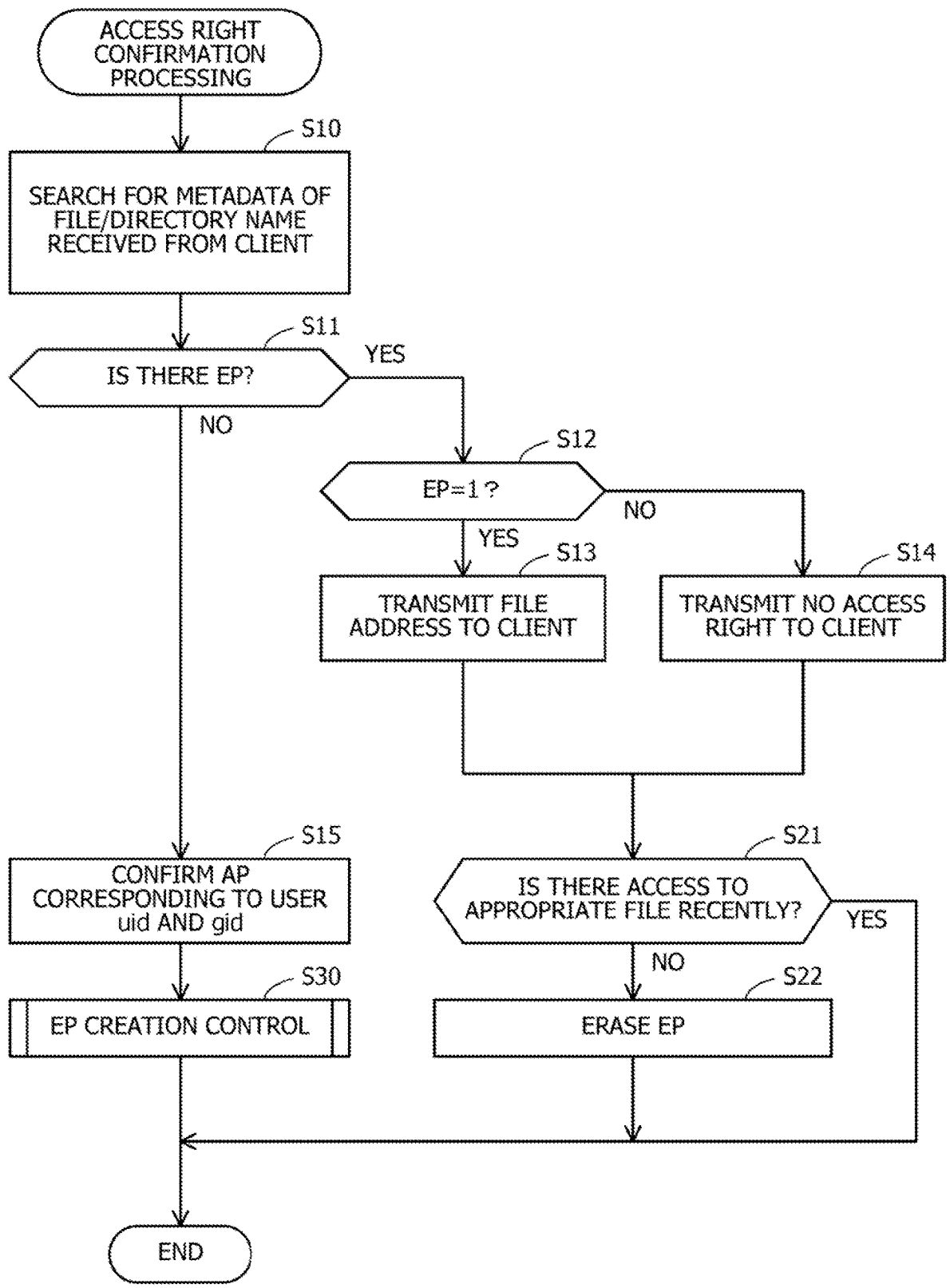
FIG. 15 is a flowchart illustrating another example of the access right confirmation processing by the MDS.

Furthermore, the access right confirmation unit 130 may delete EP as follows in order to suppress the compression on the capacity of the MDT, FIG. 15 is a flowchart illustrating another example of the access right confirmation processing by the MDS.

In the procedure in FIG. 15, steps S21 and S22 are added to the procedure in FIG. 12. Since steps other than steps S21 and S22 are similar to those in FIG. 12, description thereof will be omitted. Step S21 is executed after step S13 or step S14.

(S21) The access right confirmation unit 130 determines whether a file or directory for which the access request is made this time has been recently accessed. In the case where the file or directory has been recently accessed, the access right confirmation processing ends. In the case where the file or directory has not been recently accessed, the processing proceeds to step S22. Here, "recent" refers to a predetermined period before the access of this time. For example, the predetermined period is the most recent one week before the access of this time, for example. For example, date and time of the last access to the file or directory is recorded in the metadata 310.

(S22) The access right confirmation unit 130 erases the EP record for the file or directory from the metadata 310. As a result, the size of the metadata of the file or directory is reduced. Then, the access right confirmation processing ends.

As described above, the access right confirmation unit 130 erases the access right confirmation history according to the access history (for example, the access count) in the past predetermined period for the file in the case where the access right confirmation history has been created.

Files or directories that have not been recently accessed are likely not to be accessed in the future. Therefore, the access right confirmation unit 130 erases the EP of the files or directories that have not been recently accessed, thereby suppressing the compression on the capacity of the MDT while suppressing an influence on the access performance.

Note that, in the determination in step S21, the access right confirmation unit 130 may compare the access count in the most recent predetermined period (for example, one week) with a threshold (for example, 0, 1, 5, or the like). The threshold in this case may be determined by a method similar to the method described in FIG. 14, for example. In that case, the access right confirmation unit 130 may reset the access count table 121 to have the access count of each file to 0 in every predetermined period (for example, one week). Then, in step S21, the access right confirmation unit 130 becomes able to acquire the access count in the most recent predetermined period on the basis of the access count table 121.

Next, an example of Inquiring about the access right by the clients 500 and 500a will be described. Hereinafter, the client 500 will be described as an example, but the client 500a also executes similar processing.

Figure 16:
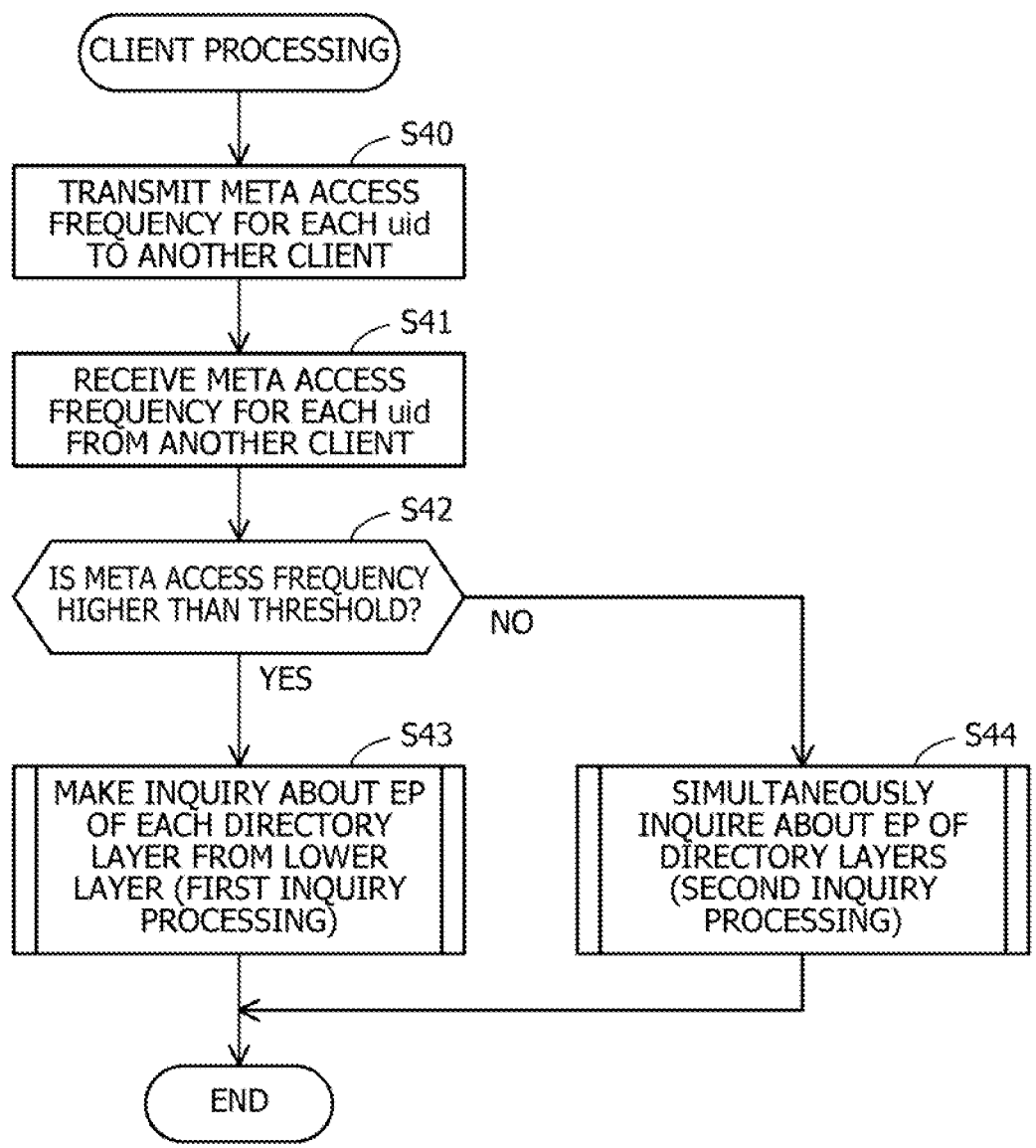
FIG. 16 is a flowchart illustrating an example of client processing.

FIG. 16 is a flowchart illustrating an example of client processing.

(S40) The client 500 transmits a meta access frequency for each uid to the client 500a that is another client. Here, the meta access frequency is the access frequency to the metadata. The client 500 can acquire the access frequency from the metadata by the access request source or a use history of a file corresponding to the metadata. The meta access frequency can also be said to be a total access count for the metadata in a fixed period. The meta access frequency is counted for each uid by the client 500 and is held by the client 500. The fixed period is, for example, one day, one week, or the like. The meta access frequency is reset in the fixed period.

(S41) The client 500 receives the meta access frequency for each uid from the client 500a that is another client. The client 500 adds the meta access frequency for each uid received from the client 500a to the meta access frequency for each uid held in the client 500.

(S42) When transmitting an access request inducting a certain user uid as the access request source to the MDS, the client 500 determines whether the meta access frequency for the user uid is higher than a threshold. In the case where the meta access frequency is higher than the threshold, the processing proceeds to step S43. In the case where the meta access frequency is equal to or lower than the threshold, the processing proceeds to step S44.

(S43) The client 500 inquires about EP of respective directory layers from a lower layer for the fife or directory of the access request destination. The inquiry processing in step S43 is referred to as first inquiry processing. Then, the client processing ends.

(S44) The client 500 simultaneously inquires about EP of respective directory layers for the directories of the file of the access request destination. The inquiry processing in step S44 is referred to as second inquiry processing. Then, the client processing ends.

Figure 17:
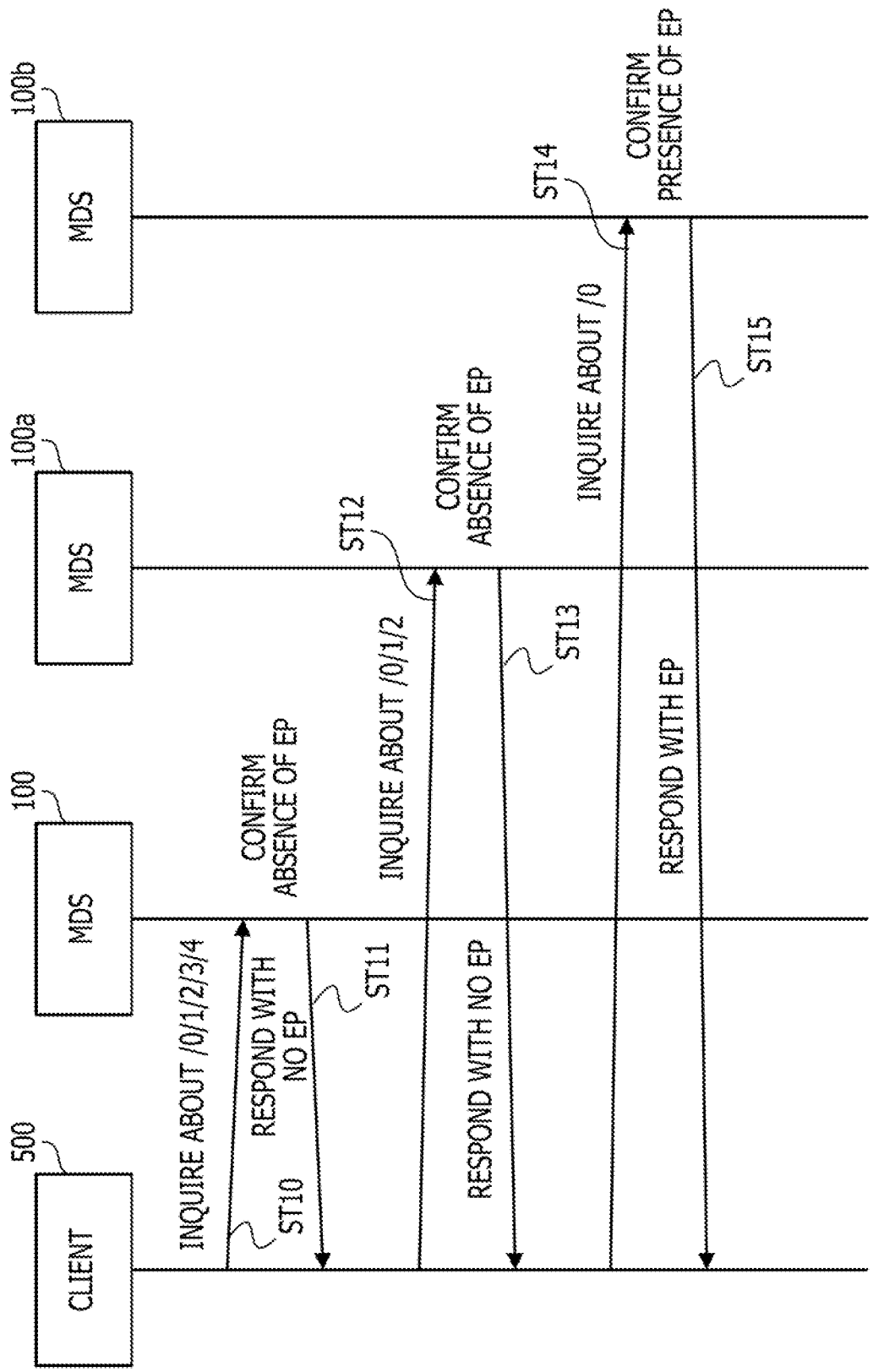
FIG. 17 is a sequence diagram illustrating an example of a first inquiry by the client.

FIG. 17 is a sequence diagram: illustrating an example of a first inquiry by the client.

In the example in FIG. 17, the final request destination is a file "/0/1/2/3/4".

(ST10) The client 500 specifies the MDS 100 as an inquiry destination on the basis of the hash value of the full path file name "/0/1/2/3/4". The client 500 inquires of the MDS 100 about the access right confirmation history of the file. The inquiry about the access right confirmation history may include the full path name of the file or directory, the user gid and the user uid of the access request source, and information indicating whether the final request destination is the final request destination (a file or directory to be acquired from the OSS).

(ST11) The MDS 100 confirms EP in response to the inquiry from the client 500. The MDS 100 confirms the absence of EP of the user uid and the user gid included in the inquiry for the file "/0/1/2/3/4" by referring to the metadata 310. The MDS 100 responds to the client 500 with no EP, that is, no access right confirmation history.

(ST12) The client 500 receives the response with no EP of the file "/0/1/2/3/4" from the MDS 100. The client 500 specifies the MDS 100a as the next inquiry destination on the basis of the hash value of the full path directory name "/0/1/2" having half the depth of the layers of the full path file name "/0/1/2/3/4". The client 500 inquires of the MDS 100a about the access right confirmation history of the directory. Note that the result of halving the depth is rounded up or down to the first decimal place so that the result of halving the depth of the layers becomes an integer.

(ST13) The MDS 100a confirms EP in response to the inquiry from the client 500. The MDS 100a confirms the absence of EP of the user uid and the user gid included in the inquiry for the directory "/0/1/2" by referring to the metadata stored in the MDT 300a. The MDS 100a responds to the client 500 with no EP, that is, no access right confirmation history.

(ST14) The client 500 receives the response with no EP of the directory "/0/1/2" from the MDS 100a. The client 500 specifies the MDS 100b as the next inquiry destination on the basis of the hash value of the full path directory name "/0" having half the depth of the layers of the full path directory name "/0/1/2". The client 500 inquires of the MDS 100b about the access right confirmation history of the directory.

(ST15) The MDS 100b confirms EP in response to the inquiry from the client 500. The MDS 100b confirms that there is EP of the user uid and the user gid included in the inquiry for the directory "/0" by referring to the metadata stored in the MDT 300b. The MDS 100b responds to the client 500 with the value of EP (0 or 1).

In this case, the access right confirmation history from the highest directory "/" to the directory "/0" for the user uid and the user gid is provided to the client 500. In the case where the client 500 has received EP=1 in step S15, the client 500 transmits the access request from "/0/1" that is one layer below the directory "/0" to inquire of the MDS about the access right based on AP. Meanwhile, in the case where the client 500 has received EP=0 in step S15, the client 500 determines that the access to the file or directory of the final request destination is not permitted and notifies the user who operates the client 500 that the access is not permitted.

Next, the procedure of the processing in FIG. 17 will be described.

Figure 18:
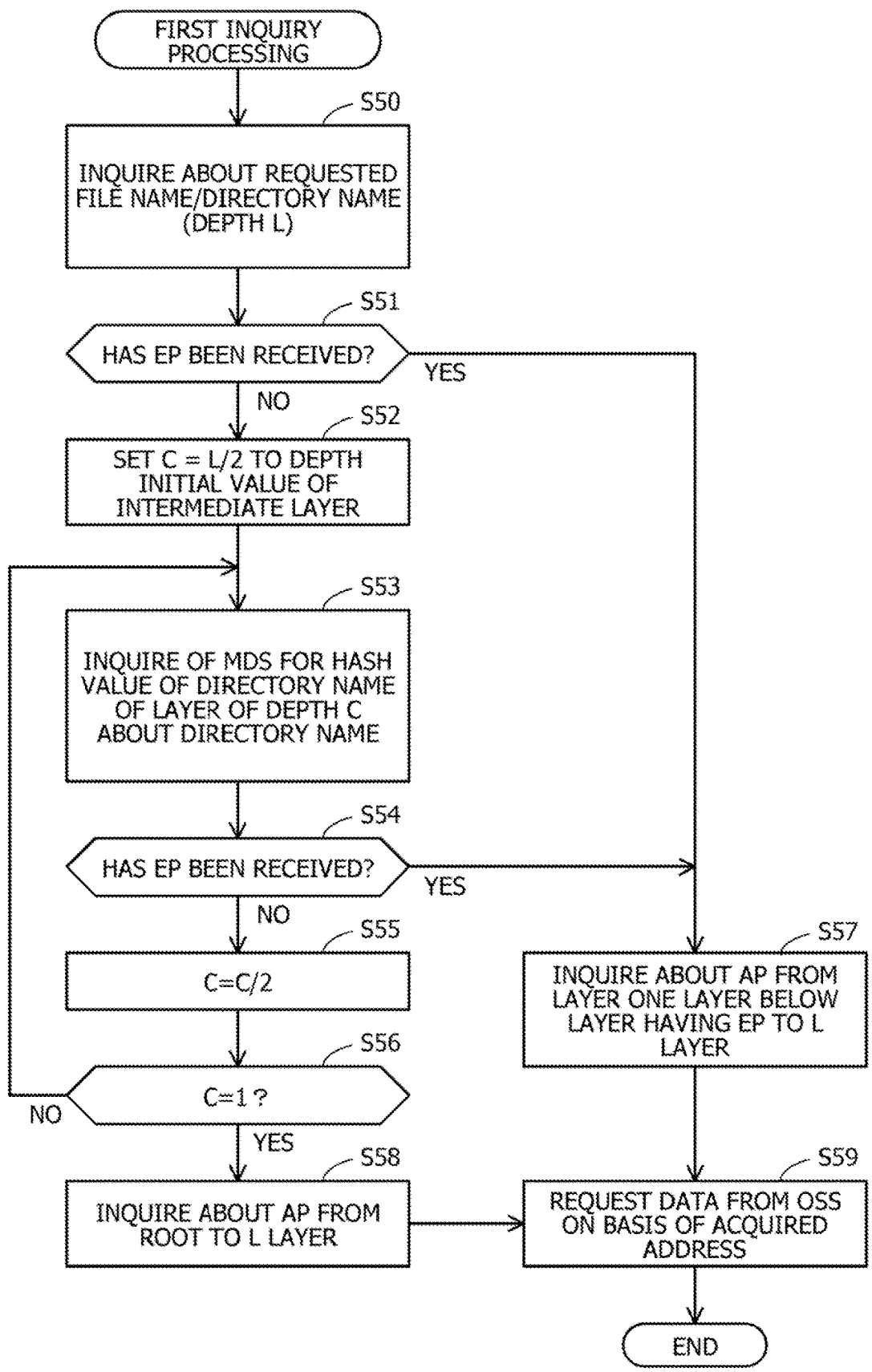
FIG. 18 is a flowchart illustrating an example of the first inquiry by the client.

FIG. 18 is a flowchart illustrating an example of the first inquiry by the client.

(S50) The access processing unit 520 inquires of the MDS corresponding to the hash value of a requested file name or directory name about the requested file name or directory name (a depth L of a directory layer). In this inquiry, the user uid and the user gid are specified. The depth L of the directory layer corresponds to the number of layers from the root directory to the requested file name or directory name.

(S51) The access processing unit 520 determines whether EP has been received from the MDS of the Inquiry destination in step S50. In the case where the EP has been received, the processing proceeds to step S57. In the case where the EP has not been received, the processing proceeds to step S52.

(S52) The access processing unit 520 sets an initial value of a depth C of an intermediate layer for the requested file name/directory name to C=L/2.

(S53) The access processing unit 520 inquires of the MDS for the hash value of the directory name in the layer of the depth C about the directory name.

(S54) The access processing unit 520 determines whether EP has been received from the MDS of the Inquiry destination in step S53. In the case where the EP has been received, the processing proceeds to step S57. In the case where the EP has not been received, the processing proceeds to step S55.

(S55) The access processing unit 520 sets the depth C=C/2.

(S56) The access processing unit 520 determines whether the depth C=1. In the case of C=1, the processing proceeds to step S58. In the case of C≠1, the processing proceeds to step S53.

(S57) In the case of EP=1, the access processing unit 520 makes an inquiry about the access right based on AP from a layer one layer below a layer having the EP to an L layer. The L layer corresponds to the layer of the file or directory of the final request destination. The access processing unit 520 acquires the storage address of the file or directory from the MDS corresponding to the L layer in the case where the presence of the access right has been confirmed on the basis of AP for all the layers from the layer one layer below the layer having the EP to the L layer. Then, the processing proceeds to step S59.

Meanwhile. In the case where the absence of the access right has been confirmed on the basis of AP in any layer, the access processing unit 520 notifies the user of no access right to the file or directory and the first inquiry ends. Alternatively, in the case of EP=0, the access processing unit 520 notifies the user of no access right to the file or directory and the first inquiry ends.

(S58) The access processing unit 520 makes an inquiry about the access right based on AP from the root directory to the L layer. The access processing unit 520 acquires the storage address of the file or directory from the MDS corresponding to the L layer in the case where the presence of the access right has been confirmed on the basis of AP for all the layers from the root directory to the L layer. Meanwhile, in the case where the absence of the access right has been confirmed on the basis of AP in any layer, the access processing unit 520 notifies the user of no access right to the file or directory and the first inquiry ends.

(S59) The access processing unit 520 requests data from the OSS on the basis of the acquired storage address. The access processing unit 520 acquires an object that is the substance of the file or directory of the final request destination from the OSS. Then, the first inquiry ends.

As described above, when receiving a response notifying that the access right confirmation history has not been created from the MDS as a response to the access request, the access processing unit 520 may inquire of another MDS that manages the metadata of an intermediate directory of a layer between a higher directory of the requested fife and the file about the presence or absence of the access authority of the access request source from the higher directory to the intermediate directory. Thereby, confirmation of the access right based on AP for the individual directories from the higher directory to the intermediate directory can be omitted. At this time, the number of inquiries may be reduced by setting the layer of the intermediate directory to be a directory two or more Sayers higher than the layer of the requested file.

More specifically, the access processing unit 520 recursively confirms the access right confirmation history based on EP for the MDS from a lower layer to a higher layer while skipping middle layers. Although FIG. 18 illustrates a binary tree search, the denominator on the right side of "C=C/2" in step S55 may be another number such as 3 or 4.

Figure 19:
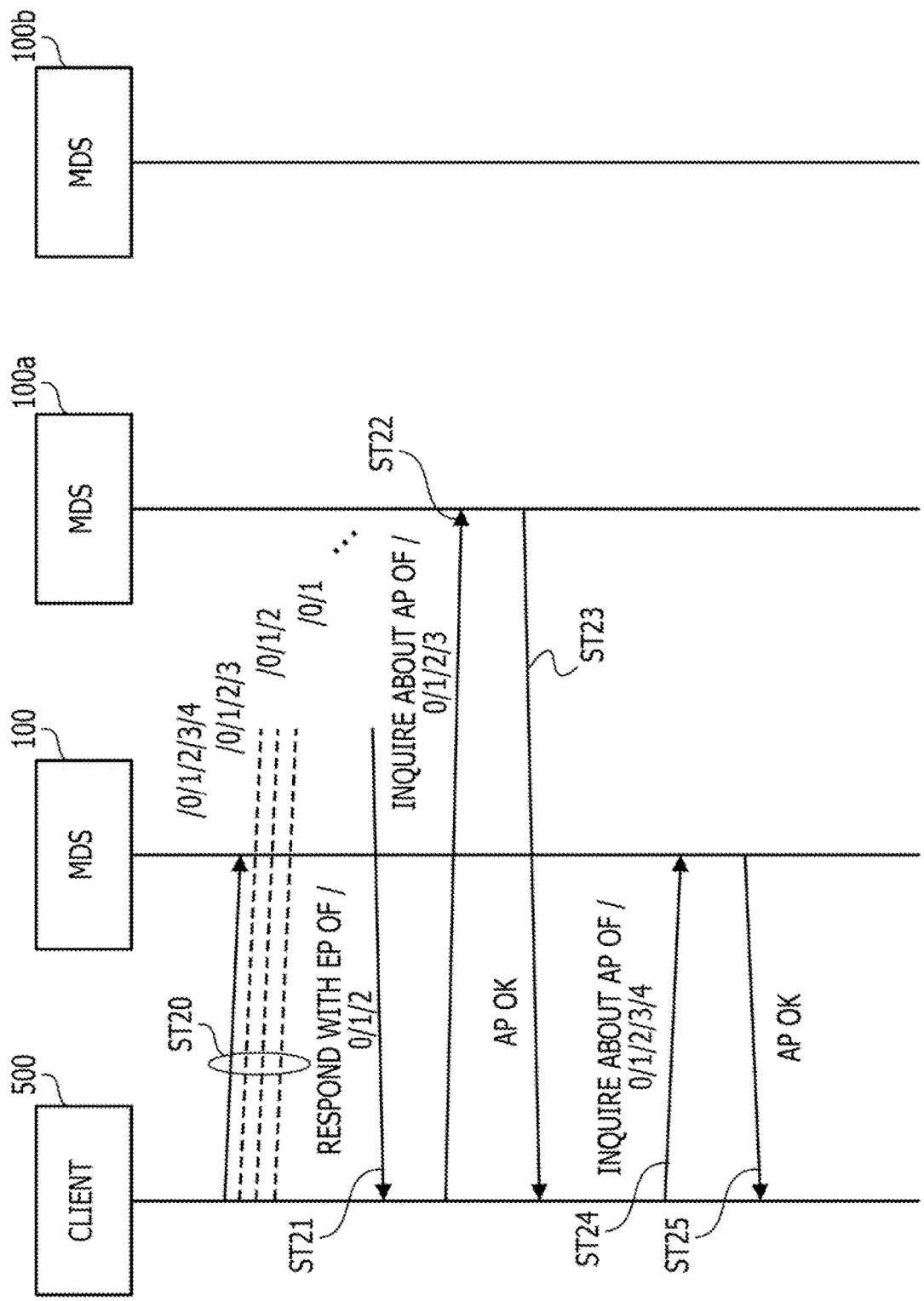
FIG. 19 is a sequence diagram illustrating an example of a second inquiry by the client.

FIG. 19 is a sequence diagram: illustrating an example of a second inquiry by the client.

In the example of FIG. 19, the final request destination is the file "/0/1/2/3/4".

(ST20) The client 500 determines respective MDSs of the inquiry destinations on the basis of the respective hash values of all the layers "/", "/0", "/0/1", "/0/1/2", "/0/1/2/3", and "/0/1/2/3/4" of the file "/0/1/2/3/4", The client 500 simultaneously inquires of the respective determined MDSs about the access right confirmation history based on EP.

(ST21) The client 500 receives a response of EP=1 regarding "/0/1/2".

(ST22) The client 500 specifies the MDS 100a of the next inquiry destination on the basis of the hash value of "/0/1/2/3" that is one layer below "/0/1/2", The client 500 inquires about the access right based on AP by transmitting the access request to the directory "/0/1/2/3" to the MDS 100a.

(ST23) The MDS 100a receives the access request from the client 500 and confirms the access right of the access request source to the directory on the basis of the AP included in the metadata of the directory "/0/1/2/3". As a result, the MDS 100a responds to the client 500 with the presence of the access right (AP OK).

(ST24) When the client 500 receives a response notifying the presence of the access right to the directory "/0/1/2/3", the client 500 next specifies the MDS 100 of the next inquiry destination on the basis of the hash value of the file "/0/1/2/3/4" of one layer below "/0/1/2/3", The client 500 inquires about the access right based on AP by transmitting the access request to the file "/0/1/2/3/4" to the MDS 100. Here, the file "/0/1/2/3/4" is the final request destination.

(ST25) The MDS 100 receives the access request from the client 500 and confirms the access right of the access request source to the directory on toe basis of the AP included in the metadata of the file "/0/1/2/3/4", As a result, the MDS 100 responds to the client 500 with the presence of the access right and the storage address of the file.

Figure 20:
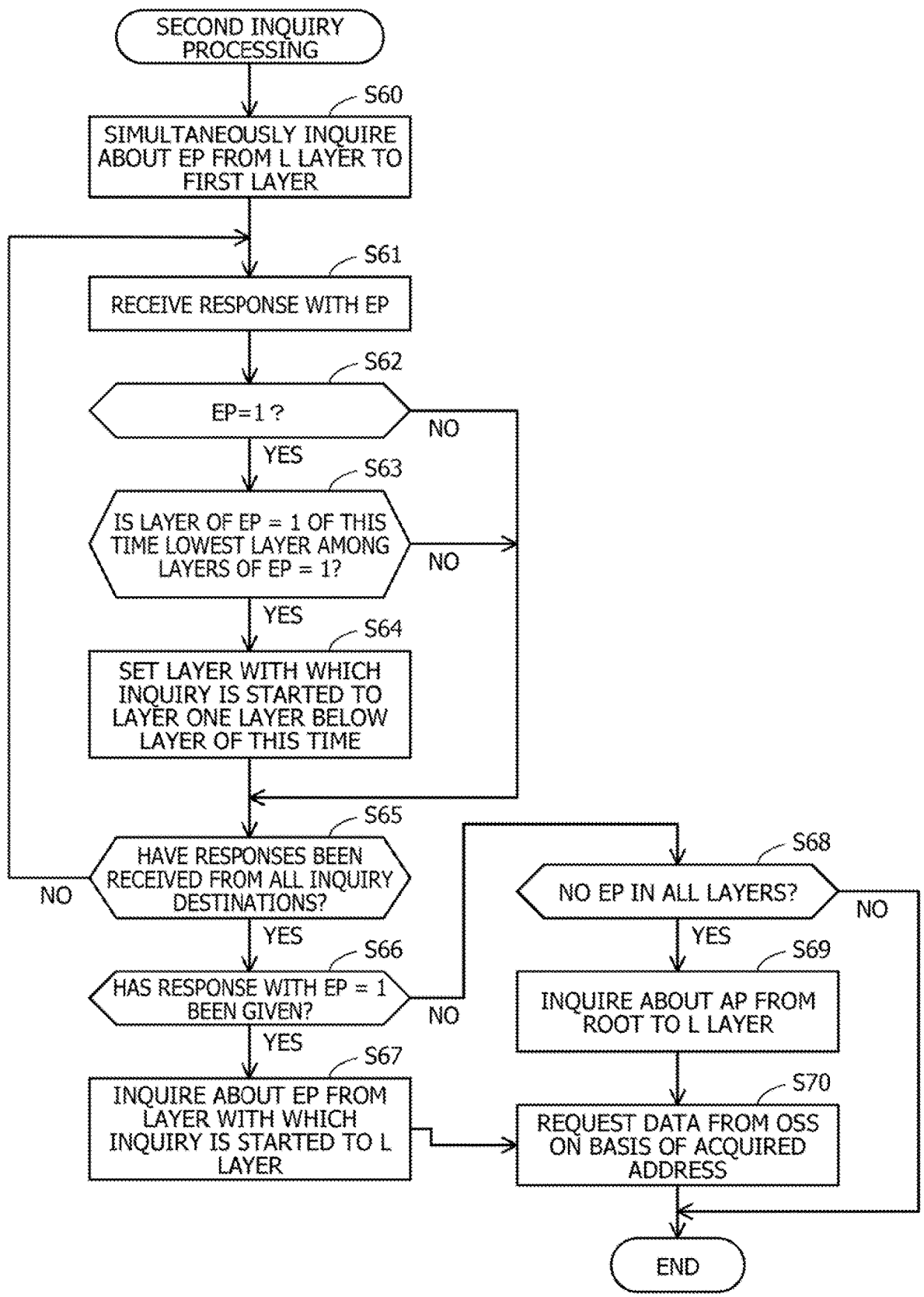
FIG. 20 is a flowchart illustrating an example of the second inquiry by the client.

Next, the procedure of the processing in FIG. 19 will be described,

FIG. 20 is a flowchart illustrating an example of the second inquiry by the client.

(S60) The access processing unit 520 simultaneously inquires of the MDSs about EP from the L layer to the first layer (root directory). Step S60 corresponds to step ST20.

(S61) The access processing unit 520 receives an EP response. The EP response includes an EP value in the case of the presence of EP. Furthermore, the EP response includes information indicating no EP in the case of the absence of EP.

(S62) The access processing unit 520 determines whether EP=1 is satisfied for the EP received in step S61. In the case of EP=1, the processing proceeds to step S63. In the case of EP=0 or no EP, the processing proceeds to step S65.

(S63) The access processing unit 520 determines whether the layer of EP=1 of this time is the lowest layer among layers of EP=1 received by the simultaneous inquiry. In the case where the layer is the lowest layer, the processing proceeds to step S64. In the case where the layer is not the lowest layer, the processing proceeds to step S65.

(S64) The access processing unit 520 sets one layer below the layer of EP=1 received this time as the layer with which the inquiry about the access right based on AP is started.

(S65) The access processing unit 520 determines whether the responses have been received from all the MDSs of the inquiry destinations to which the simultaneous inquiry has been transmitted in step S60. In the case where the responses have been received from all the MDSs of the inquiry destinations, the processing proceeds to step S66. In the case where there is an MDS from which a response has not been received, the processing proceeds to step S61.

(S66) The access processing unit 520 determines whether a response of EP=1 has been given to the simultaneous inquiry in step S60. In the case where the response of EP=1 has been given, the processing proceeds to step S67. In the case where no response of EP=1 has been given, the processing proceeds to step S68.

(S67) The access processing unit 520 makes an inquiry about the access right based on AP from the layer with which the inquiry is started to the L layer. The access processing unit 520 acquires the storage address of the file or directory from the MDS corresponding to the t layer in the case where the presence of the access right has been confirmed on the basis of AP for all the layers from the layer with which the inquiry is started to the L layer. Then, the processing proceeds to step S70.

Meanwhile, in the case where the absence of the access right has been confirmed on the basis of AP in any layer, the access processing unit 520 notifies the user of no access right to the file or directory and the second inquiry ends.

(S68) The access processing unit 520 determines whether the response of no EP has been received for all the layers. In the case where the response of no EP has been received for all the Sayers, the processing proceeds to step S69. In the case where the presence of EP (in this case, EP=0) has been confirmed in any layer, the second inquiry ends.

(S69) The access processing unit 520 makes an inquiry about the access right based on AP from the root directory to the L layer. The access processing unit 520 acquires the storage address of the file or directory from the MDS corresponding to the L layer in the case where the presence of the access right has been confirmed on the basis of AP for all the layers from the root directory to the L layer. Mean-while, in the case where the absence of the access right has been confirmed on the basis of AP in any layer, the access processing unit 520 notifies the user of no access right to the file or directory and the second inquiry ends.

(S70) The access processing unit 520 requests data from the OSS on the basis of the acquired storage address. The access processing unit 520 acquires an object that is the substance of the file or directory of the final request destination from the OSS. Then, the second inquiry ends.

As described above, the access processing unit 520 selects whether to simultaneously inquire of the MDSs 100, 100*a*, and 100*b* about the presence or absence of the access right of the access request source from a higher directory of the requested file to the directory of the file, for directories of all the layers between the higher directory to the requested file, in addition to transmission of the access request, on the basis of the use history by the access request source (or the access frequency grasped on the basis of the use history).

That is, the clients 500 and 500*a* selectively use the first inquiry and the second inquiry according to the meta access frequency counted for the user uid of the access request source. Note that the meta access frequency may be counted for each user gid.

Here, in the case where the meta access frequency is relatively high, it can be said that the user uid tends to open the file a relatively large number of times in a fixed period. In this case, the user needs a large number of fifes at one time, and it is presumed that the clients 500 and 500*a* each sequentially inquire of different flies. Therefore, the clients 500 and 500*a* may shorten the time for the clients 500 and 500*a* to acquire the file by selecting the first inquiry.

Meanwhile, in the case where the meta access frequency Is relatively low, it can be said that the user tends to need one file at a time. In this case, the clients 500 and 500*a* are presumed to sequentially open, read, write, and close the file, so if the latency for confirming the access right is long, it takes time to access the file. Therefore, the clients 500 and 500*a* may shorten the time for the clients 500 and 500*a* to acquire the file by selecting the second inquiry and simultaneously inquiring of the respective MDSs.

Note that it is conceivable that the clients 500 and 500*a* selects one of the first inquiry and the second inquiry in consideration of the load of the MDSs 300, 300*a*, and 300*b*, in addition to the meta access frequency.

Figure 21:
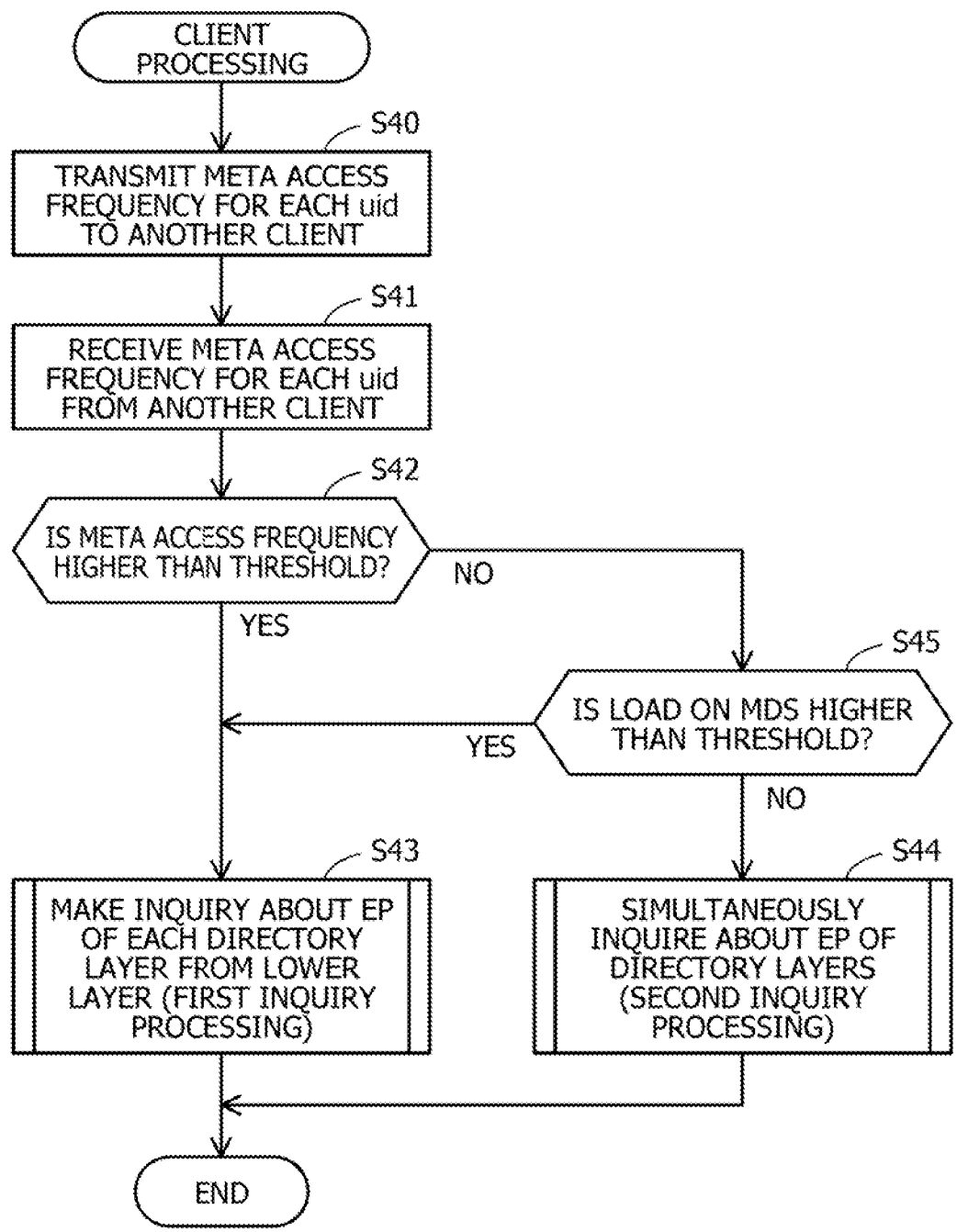
FIG. 21 is a flowchart illustrating another example of the client processing.

FIG. 21 is a flowchart illustrating another example of the client processing.

The procedure in FIG. 21 differs from the procedure in FIG. 16 in that step S45 is added. Steps other than step S45 are similar to those in FIG. 16, and thus description thereof will be omitted. Step S45 is executed in the case of No in step S42.

(S45) The access processing unit 520 determines whether a load on the MDS is higher than a threshold. In the case where the load on the FIDS is higher than the threshold, the processing proceeds to step S43. In the case where the load on the MDS is equal to or smaller than the threshold, the processing proceeds to step S44.

Here, the access processing unit 520 may determine Yes in step S45 when the loads on all the MDSs 300, 300*a*, and 300*b* are higher than the threshold in step S45, and may determine No in step S45 when the load on any of the MDSs 300, 300*a*, and 300*b* is equal to or smaller than the threshold. Alternatively, the access processing unit 520 may determine Yes in step S45 when an average of the loads on the MDSs 300, 300*a*, and 300*b* is higher than a threshold in step S45, and may determine No in step S45 when the average of the loads is equal to or smaller than the threshold.

As described above, in the case where the loads on the MDSs 300, 300*a*, and 300*b* are determined to be relatively high even in the case where the meta access frequency is relatively high, overloads on the MDSs 300, 300*a*, and 300*b* may be suppressed by avoiding the second inquiry. Therefore, deterioration of the access performance to the file may be suppressed.

Note that the first inquiry by the above clients 500 and 500*a* can be performed by the MDSs 300, 300*a*, and 300*b*. A specific procedure is as follows.

Figure 22:
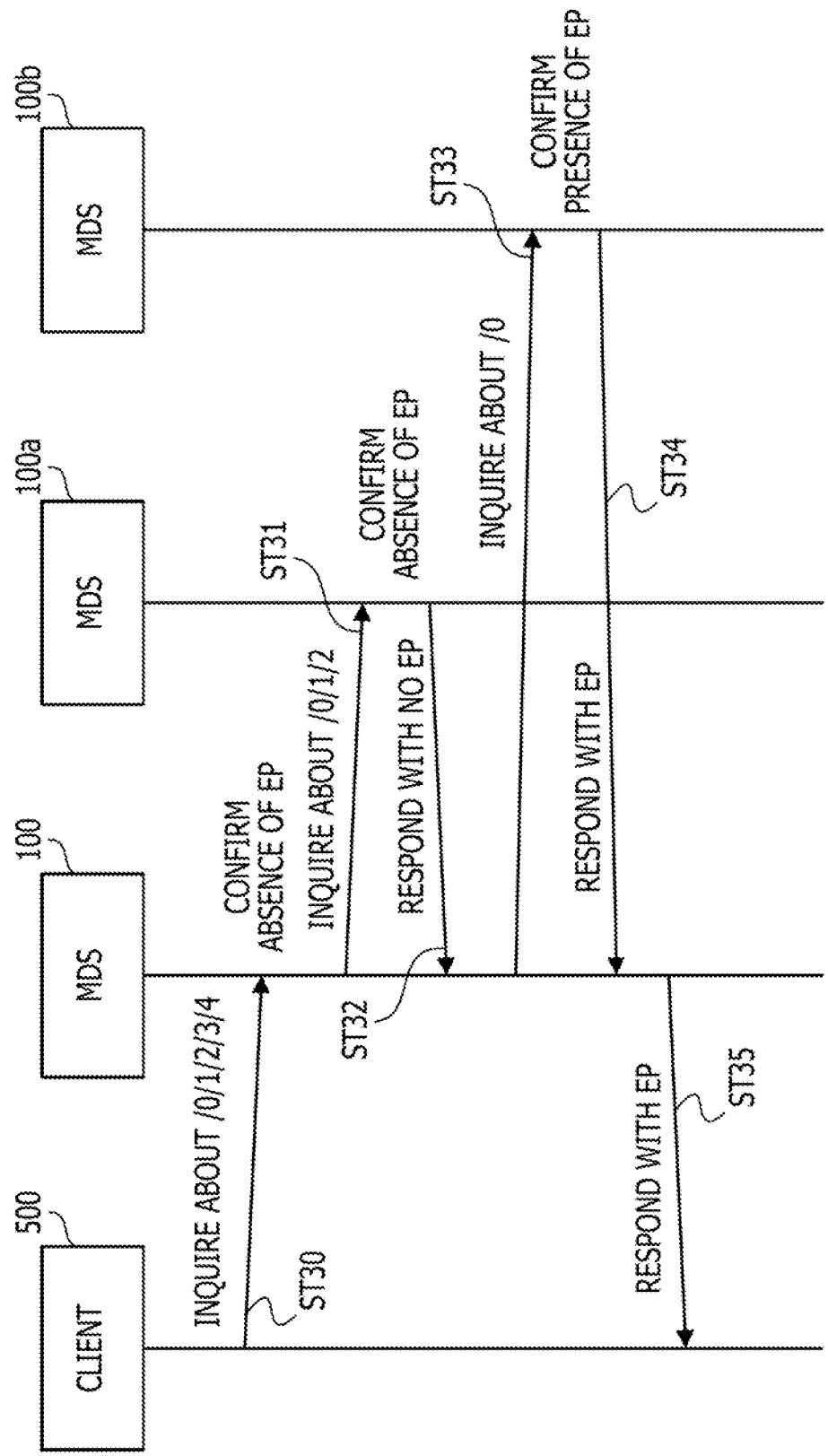
FIG. 22 is a sequence diagram illustrating an example of EP confirmation by the HDS.

FIG. 22 is a sequence diagram illustrating an example of EP confirmation by the MDS.

In the example in FIG. 17, the final request destination is a file "/0/1/2/3/4".

(ST30) The client 500 specifies the MDS 100 as an inquiry destination on the basis of the hash value of the full path file name "/0/1/2/3/4". The client 500 inquires of the MDS 100 about the access right confirmation history of the file. The inquiry about the access right confirmation history may include the full path name of the file or directory, the user gid and the user uid of the access request source, and information indicating whether the final request destination is the final request destination (a file or directory to be acquired from the OSS). The MDS 100 confirms EP in response to the inquiry from the client 500. The MDS 100 confirms the absence of EP of the user uid and the user gid included in the inquiry for the file "/0/1/2/3/4" by referring to the metadata 310.

(ST31) The MDS 100 specifies the MDS 100*a* as the next inquiry destination on the basis of the hash value of the full path directory name "/0/1/2" having half the depth of the layers of the full path file name "/0/1/2/3/4". The MDS 100 inquires of the MDS 100*a* about the access right confirmation history of the directory. Note that the result of halving the depth is rounded up or down to the first decimal place so that the result of halving the depth of the layers becomes an integer.

(ST32) The MDS 100*a* confirms EP in response to the inquiry from the MDS 100. The MDS 100*a* confirms the absence of EP of the user uid and the user gid included in the inquiry for the directory "/0/1/2" by referring to the metadata stored in the MDT 300*a*. The MDS 100*a* responds to the MDS 100 with no EP, that is, no access right confirmation history.

(ST33) The MDS 100 receives the response with no EP of the directory "/0/1/2" from the MDS 100*a*. The MDS 100 specifies the MDS 100*b* as the next inquiry destination on the basis of the hash value of the full path directory name "/0" having half the depth of the layers of the full path directory name "/0/1/2", The MDS 100 inquires of the MDS 100*b* about the access right confirmation history of the directory.

(ST34) The MDS 100*b* confirms EP in response to the inquiry from the MDS 100. The MDS 100*b* confirms that there is EP of the user uid and the user gid included in the inquiry for the directory "/0" by referring to the metadata stored in the MDT 300*b*. The MDS 100*b* responds to the MDS 100 with the value of EP (0 or 1).

(ST35) When receiving the value of EP regarding the directory "/0" from the MDS 100*b*, the MDS 100 responds with the client 500 with the value of EP for the directory "/0".

In this case, the access right confirmation history from the highest directory "/" to the directory "/0" of the directory "/0" for the user uid and the user gid is provided to the client 500. In the case where the client 500 has received EP=1 in step ST35, the client 500 starts access request from "/0/1" that is one layer below the directory "/0" to inquire of the MDS about the access right based on AP. The inquiry of the access right based on AP may be made by the MDS 100 in the example in FIG. 21. Meanwhile, in the case where the client 500 has received EP=0 in step ST35, the client 500 determines that the access to the file or directory of the final request destination is not permitted and notifies the user who operates the client 500 that the access is not permitted.

Next, the procedure of the processing in FIG. 22 will be described.

Figure 23:
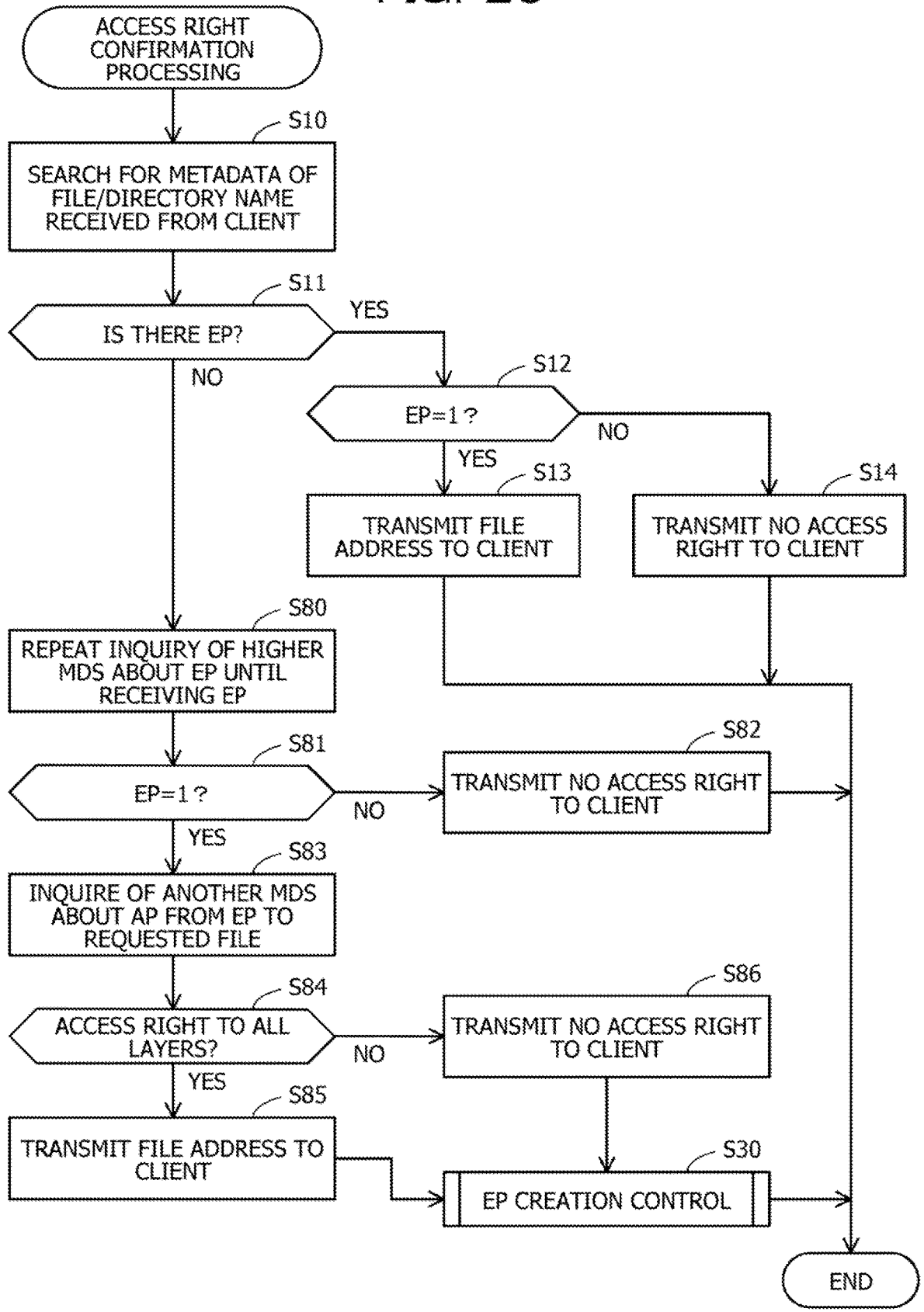
FIG. 23 is a flowchart illustrating an example of the access right confirmation processing by the MDS.

FIG. 23 is a flowchart illustrating an example of the access right confirmation processing by the MDS, FIG. 23 is different from FIG. 12 in that step S80 is executed instead of step S15, and steps S81 to S86 are executed after step S80. Steps other than steps S80 to S86 are similar to those in FIG. 12, and thus description thereof will be omitted. Step S80 is executed in the case of No in step S11.

(S80) The access right confirmation unit 130 repeats the inquiry of a higher MDS about EP until receiving EP. Here, the higher MDS refers to the MDS that manages the metadata of a higher directory of the file/directory requested by the client 500 in step S10. The access right confirmation unit 130 determines the layer of the higher directory to be inquired about EP by a procedure similar to steps S52 to S56 in FIG. 18.

(S81) The access right confirmation unit 130 determines whether EP=1 is satisfied for the EP received from the higher MDS. In the case of EP=1, the processing proceeds to step S83. In the case of EP=0, the processing proceeds to step S82.

(S82) The access right confirmation unit 130 transmits the absence of the access right to the client 500. Then, the access right confirmation processing ends.

(S83) The access right confirmation unit 130 inquires of another MDS about the access right based on AP from the layer of EP=1 to the file or directory of the final request destination. Here, in the drawing, the file or directory of the final request destination is illustrated as "requested file".

(S84) The access right confirmation unit 130 determines whether there is the access right for all the layers from the layer of EP=1 to the file or directory of the final request destination. In the case where the access right is present for all the layers, the processing proceeds to step S85. In the case where no access right is present for any of the layers, the processing proceeds to step S86.

(S85) The access right confirmation unit 130 transmits the storage address of the file or directory to the client 500. Then, the processing proceeds to step S30.

(S86) The access right confirmation unit 130 transmits the absence of the access right to the client 500. Then, the processing proceeds to step S30.

As described above, in the case where access right confirmation history has not been created, the access right confirmation unit 130 may inquire of another MDS that manages the metadata of an intermediate directory of a layer between the higher directory of the requested file and the file about the presence or absence of the access right of the access request source from the higher directory to the intermediate directory. Thereby, confirmation of the access right based on AP for the individual directories from the higher directory to the intermediate directory can be omitted.

Note that in the EP creation control in step S30, whether to store the confirmation result of the access right by AP in the MDS 100 in step S84, as a history, is determined. Furthermore, in the case where the response indicates no EP up to the highest MDS corresponding to the root directory in step S80, the access right confirmation unit 130 executes the processing in step S83 and the subsequent steps, using a starting point of the inquiry destination of the access right by AP as a root directory.

As in the procedure in FIG. 23, it is conceivable to make the inquiry about EP for the respective MDSs by the MDS 100 that manages the metadata of the file requested by the client 500. Since the MDS 100, instead of the client 500, makes the inquiry of a higher MDS, the communication amount between the client 500 and each MDS may be reduced as compared with the case where the client 500 makes the inquiry of the higher MDS. Furthermore, communication of unnecessary inquiries between the client 500 and each MDS can be blocked. For example, an unauthorized access chance from the client 500 to each MDS may be reduced. Therefore, occurrence of unauthorized access such as tampering with the content of the metadata or the files may be suppressed and the reliability of the file management is improved.

Moreover, it is also conceivable that the MDSs 100, 100a, and 100b store EP in the respective caches of the MDSs 100, 100a, and 100b and shorten the lookup time for the metadata when confirming the presence or absence of EP.

Figure 24:
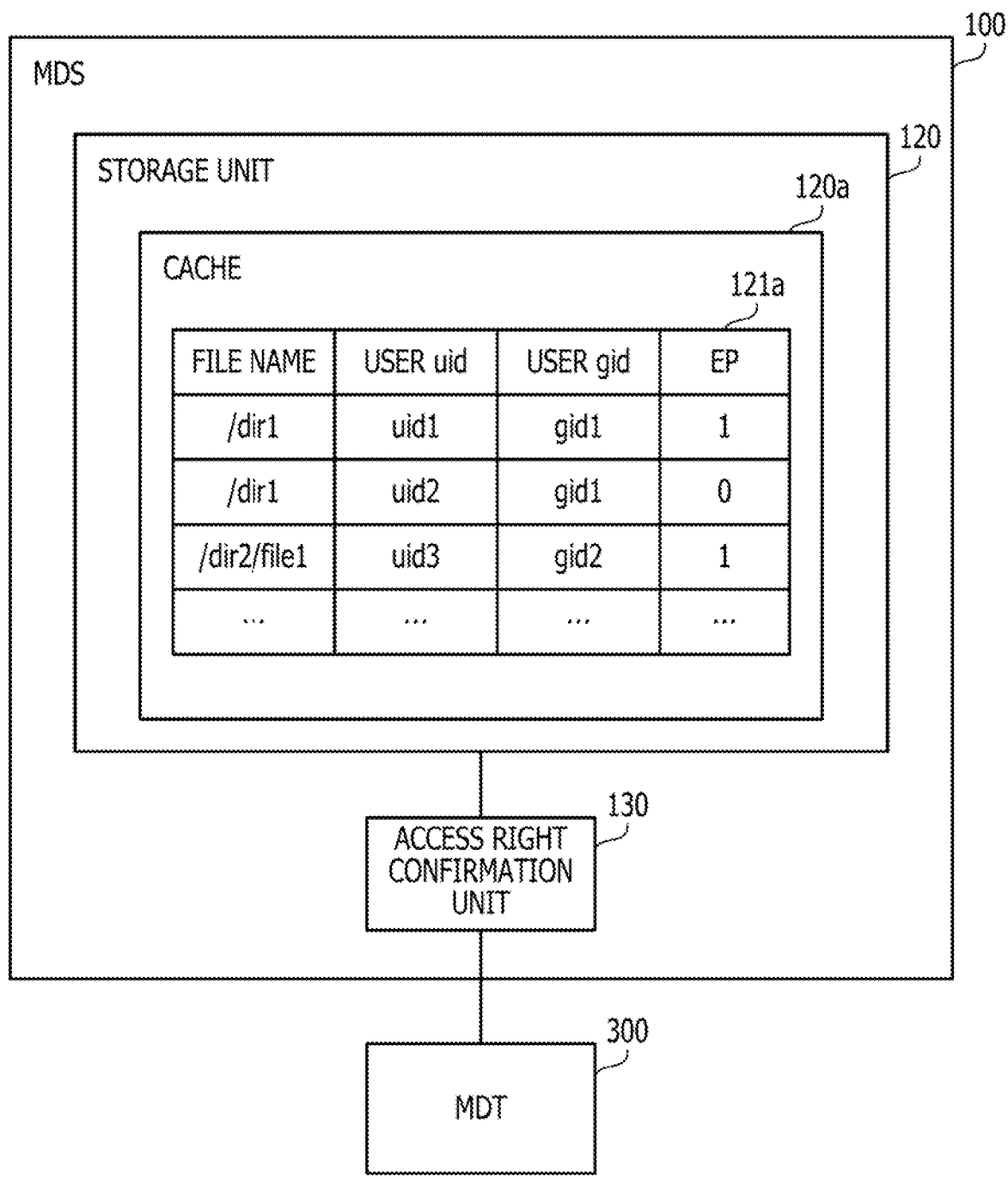
FIG. 24 is a diagram illustrating an example of an EP cache table.

FIG. 24 is a diagram illustrating an example of an EP cache table.

The storage unit 120 has a cache 120a. A storage area of the RAM 102 is used as the cache 120a. The cache 120a stores an EP cache table 121a. Some items of the metadata 310 are registered in the EP cache table 121a. The EP cache table 121a includes items of file name, user uid, user gid, and EP.

In the item of file name, a file name or a directory name is registered. In the item of user uid, the user uid is registered. In the item of user gid, the user gid is registered. In the item of EP, an EP value is registered. For example, in the EP cache table 121a, records similar to the content illustrated in FIG. 8 are registered.

The access right confirmation unit 130 creates the EP cache table 121a on the basis of the metadata 310 stored in the MDT 300 and stores the EP cache table 121a in the cache 120a. The records of the EP cache table 121a may be created all at once at predetermined timing such as when the MDT 300 is started or may be added for each appropriate file/directory at the time of confirming or generating EP of the file/directory. The access right confirmation unit 130 reflects the content of the EP cache table 121a in the metadata 310 at predetermined timing, for example, when the MDS 100 is shut down or the like.

When confirming the access right according to the access right confirmation history, the access right confirmation unit 130 may refer to the EP cache table 121a stored in the cache 120a. Therefore, the EP confirmation may be performed faster than referring to the metadata 310 stored in the MDT 300. As a result, the file access by the clients 500 and 500a is further accelerated.

Note that, in FIG. 15, an example of erasing EP in accordance with the presence or absence of recent access or the access count to a file has been described. However, another method is conceivable as the method of selecting EP to be erased. The method of erasing EP described below is applicable to the EP cache table 121a.

For example, it is conceivable that the MDSs 100, 100a, and 100b measure the access frequency to the metadata, that is, to a file for each user uid or user gid, and erase EP for the user uid or user gid with the access frequency that is equal to or lower than a threshold. That is, the MDSs 100, 100a, and 100b preferentially keep EP for the user uid or user gid having a higher access frequency than the threshold.

More specifically, the MDSs 100, 100a, and 100b record the access count in a predetermined period to the metadata for each user uid or user gid, and keeps EP having higher access count when a new access is made. Thereby, a confirmation time for the access right may be shortened for a user who has a relatively high access frequency to the metadata.

Furthermore, the MDSs 100, 100a, and 100b may keep EP of a file having a higher access frequency than a threshold according to the access frequency for each file. Thereby, the confirmation time for the access right may be shortened for a file having a relatively high access frequency. Note that, in the case where the EP to be erased is not able to be determined according to the access frequency for each use and the access frequency for each file, the EP to be erased is selected giving a priority to the access frequency for each user.

Alternatively, it is conceivable that the MDSs 100, 100a, and 100b erase EP for the user uid or user gid who pays a system use fee amount that is equal to or smaller than a threshold. That is, the MDSs 100, 100a, and 100b may preferentially keep EP for the user uid or user gid who pays a higher amount of the system use fee than the threshold. For example, the MDSs 100, 100a, and 100b may be controlled to keep a larger number of EP for users paying more surcharges. Thereby, the confirmation time for the access right may be shortened for a user who pays a relatively large amount of system use fee.

The advantages of the information processing system 2 can be summarized as follows.

By creating EP as the access right confirmation history, the access right based on EP can be confirmed. Thereby, the management of the access right is made efficient. In addition, authority management may be promptly performed.

Furthermore, the load of the authority management on higher directories may be reduced. For example, since EP is not created when a file is created, the number of times of communication with higher directories is reduced. Furthermore, the number of times of communication with higher directories may be reduced when the access right to a higher directory is changed. When the access request is received, EP is dynamically created according to the access count to a file. Therefore, the background management load on the MDSs 100, 100a, and 100b may be reduced. In the case where EP is stored, confirmation of the access right to a directory higher than a directory having the EP may be omitted.

Furthermore, the client 500 or 500a selects either the first inquiry or the second inquiry on the basis of a file access status for each user, thereby selecting either latency reduction or throughput improvement, which is more appropriate. For example, the file access may be speeded up by enabling a method of simultaneously inquiring of all the MDSs that manage higher directories about the access right based on EP, as the second inquiry. Furthermore, unnecessary communication between the MDS and the client may be reduced by the MDS executing an inquiry about the access right to a higher directory.

Moreover, capacities of caches may be saved while speeding up the confirmation of the access right by storing only a portion corresponding to the access right confirmation history of the metadata, in the respective caches of the MDSs 100, 100a, and 100b.

Note that the information processing according to the first embodiment may be implemented by causing the processing unit 12 to execute the program. Furthermore, the information processing of the second embodiment can be implemented by causing the CPU 101 to execute the program. The program can be recorded in the computer-readable recording medium 113.

For example, the program can be distributed by distributing the recording medium 113 in which the program is recorded. Alternatively, the program may be stored in another computer and distributed via a network. For example, a computer may store (install) the program, which is recorded in the recording medium 113 or received from another computer, in a storage device such as the RAM 102 or the HDD 103, read the program from the storage device, and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. An information processing system configured to perform access management using meta information including information indicating access authority for directories having a hierarchical structure for accessing a file, the information processing system comprising
   a plurality of information processing devices configured to manage the meta information of each directory from a higher directory of the file to the file in a distributed manner,
   at least one information processing device among the plurality of information processing devices includes a memory and a processor coupled to the memory, the processor is configured to:
   receive, from an access request source via a communication apparatus, an access request to the file;
   in response to the receiving of the access request to the file, determine whether an access right confirmation history for the file has been stored in the memory in association with the access request source;
   in response to the determining that the access right confirmation history for the file has not been stored in the memory in association with the access request source, perform processing including:
   performing confirmation of the access authority of the access request source for each directory in the hierarchical structure from the higher directory of the file to the file based on the meta information, to respond with a confirmation result obtained by the performing of the confirmation of the access authority;
   in response to the performing of the confirmation of the access authority, obtaining a determination result by determining whether to create the access right confirmation history of the confirmation result of the access authority of the access request source from the higher directory to the file on a basis of an access history for the file; and
   in response to the determination result indicating that the creating of the access right confirmation history is to be performed, creating the access right confirmation history for the file, to store in the memory the created access right confirmation history in association with identification information of the access request source; and
   in response to the determining that the access right confirmation history for the file has been stored in the memory in association with the access request source, omit the performing of the confirmation of the access authority of the access request source for each directory in the hierarchical structure from the higher directory of the file to the file based on the meta information, to respond with a confirmation result based on the access right confirmation history.

2. The information processing system according to claim 1, wherein the information processing device erases the access right confirmation history according to the access history in a past predetermined period for the file in the case where the access right confirmation history has been created.

3. The information processing system according to claim 1, wherein the information processing device inquires of another information processing device that manages the meta information of an intermediate directory of a layer between the higher directory and the file about the access authority of the access request source from the higher directory to the intermediate directory in a case where the access right confirmation history has not been created.

4. The information processing system according to claim 1, further comprising
   a client device configured to:
   transmit the access request to the information processing device; and
   inquire of another information processing device that manages the meta information of an intermediate directory of a layer between the higher directory and the file about the access authority of the access request source from the higher directory to the intermediate directory when receiving a notification notifying that the access right confirmation history has not been created from the information processing device as a response to the access request.

5. The information processing system according to claim 4, wherein the client device selects whether to simultaneously inquire of the plurality of information processing devices including the information processing device and the another information processing device about the access authority of the access request source from the higher directory to directories of all of layers between the higher directory and the file, in addition to transmission of the access request, on a basis of a use history by the access request source.

6. The information processing system according to claim 3, wherein the intermediate directory is a directory higher by two or more layers than a layer of the file of an access request destination.

7. An information processing device used in an information processing system that performs access management using meta information including information indicating access authority for directories having a hierarchical structure for accessing a file, the information processing device comprising:
   a memory; and
   a processor coupled to the memory, the processor being configured to:
   receive, from an access request source via a communication apparatus, an access request to the file;
   in response to the receiving of the access request to the file, determine whether an access right confirmation history for the file has been stored in the memory in association with the access request source;

in response to the determining that the access right confirmation history for the file has not been stored in the memory in association with the access request source, perform processing including:

performing confirmation of the access authority of the access request source for each directory in the hierarchical structure from the higher directory of the file to the file based on the meta information, to respond with a confirmation result obtained by the performing of the confirmation of the access authority;

in response to the performing of the confirmation of the access authority, obtaining a determination result by determining whether to create the access right confirmation history of the confirmation result of the access authority of the access request source from the higher directory to the file on a basis of an access history for the file; and in response to the determination result indicating that the creating of the access right confirmation history is to be performed, creating the access right confirmation history for the file, to store in the memory the created access right confirmation history in association with identification information of the access request source; and in response to the determining that the access right confirmation history for the file has been stored in the memory in association with the access request source, omit the performing of the confirmation of the access authority of the access request source for each directory in the hierarchical structure from the higher directory of the file to the file based on the meta information, to respond with a confirmation result based on the access right confirmation history.

8. A non-transitory computer-readable storage medium for storing a program which causes a computer to perform processing, the computer being used in an information processing system that performs access management using meta information including information indicating access authority for directories having a hierarchical structure for accessing a file, the processing comprising:

receiving, from an access request source via a communication apparatus, an access request to the file;

in response to the receiving of the access request to the file, determine whether an access right confirmation history for the file has been stored in the memory in association with the access request source;

in response to the determining that the access right confirmation history for the file has not been stored in the memory in association with the access request source, perform processing including:

performing confirmation of the access authority of the access request source for each directory in the hierarchical structure from the higher directory of the file to the file based on the meta information, to responding with a confirmation result obtained by the performing of the confirmation of the access authority;

in response to the performing of the confirmation of the access authority, obtaining a determination result by determining whether to create the access right confirmation history of the confirmation result of the access authority of the access request source from the higher directory to the file on a basis of an access history for the file; and in response to the determination result indicating that the creating of the access right confirmation history is to be performed, creating the access right confirmation history for the file, to store in the memory the created access right confirmation history in association with identification information of the access request source; and in response to the determining that the access right confirmation history for the file has been stored in the memory in association with the access request source, omit the performing of the confirmation of the access authority of the access request source for each directory in the hierarchical structure from the higher directory of the file to the file based on the meta information, to respond with a confirmation result based on the access right confirmation history.

* * * * *